United States Patent
Zubair

(10) Patent No.: US 12,508,570 B2
(45) Date of Patent: Dec. 30, 2025

(54) BIOCHAR-SUPPORTED LAYERED DOUBLE HYDROXIDE-CELLULOSE NANOCRYSTALS COMPOSITE FOR DYE REMOVAL

(71) Applicant: Imam Abdulrahman Bin Faisal University, Dammam (SA)

(72) Inventor: Mukarram Zubair, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 370 days.

(21) Appl. No.: 18/191,535

(22) Filed: Mar. 28, 2023

(65) Prior Publication Data
US 2024/0326009 A1 Oct. 3, 2024

(51) Int. Cl.
*B01J 20/06* (2006.01)
*B01J 20/20* (2006.01)
(Continued)

(52) U.S. Cl.
CPC ............. *B01J 20/06* (2013.01); *B01J 20/20* (2013.01); *B01J 20/24* (2013.01); *B01J 20/28007* (2013.01); *B01J 20/28019* (2013.01); *B01J 20/2803* (2013.01); *B01J 20/28061* (2013.01); *B01J 20/28083* (2013.01); *B01J 20/3078* (2013.01); *B01J 20/3212* (2013.01); *B01J 20/3214* (2013.01); *B01J 20/3236* (2013.01); *B01J 20/324* (2013.01); *B01J 20/3293* (2013.01); *C02F 1/288* (2013.01); *C02F 1/281* (2013.01); *C02F 1/283* (2013.01);
(Continued)

(58) Field of Classification Search
CPC ... B01J 20/06; B01J 20/20; B01J 20/24; B01J 20/28007; B01J 20/28019; B01J 20/2803; B01J 20/28061; B01J 20/28083; B01J 20/3078; B01J 20/3204; B01J 20/3212; B01J 20/3214; B01J 20/3236; B01J 20/324; B01J 20/3293; C02F 1/281; C02F 1/283; C02F 1/286; C02F 1/288; C02F 2101/308; C02F 2103/30; C02F 2305/08
USPC ....................................................... 210/694
See application file for complete search history.

(56) References Cited

U.S. PATENT DOCUMENTS

2018/0327681 A1    11/2018   Eddy

FOREIGN PATENT DOCUMENTS

| CN | 108837803 A | 11/2018 |
| CN | 109289787 A | 2/2019 |

(Continued)

OTHER PUBLICATIONS

Zubair et al, Engineered biochar supported layered double hydroxide-cellulose nanocrystals composite—: Synthesis, characterization and azo dye removal performance, Chemosphere 307, pp. 1-17 (Year: 2022).*

(Continued)

*Primary Examiner* — Claire A Norris
(74) *Attorney, Agent, or Firm* — Oblon, McClelland, Maier & Neustadt, L.L.P.

(57) ABSTRACT

A method of adsorbing a dye from an aqueous solution including contacting a composition with the aqueous solution. At least a portion of the dye adsorbs to the composition. The composition includes biochar, cellulose nanocrystals, and a layered double hydroxide (LDH). The LDH includes Cu and Fe. Particles of the LDH and the biochar at least partially cover an outer surface of the cellulose nanocrystals.

18 Claims, 28 Drawing Sheets

(51) Int. Cl.
  *B01J 20/24* (2006.01)
  *B01J 20/28* (2006.01)
  *B01J 20/30* (2006.01)
  *B01J 20/32* (2006.01)
  *C02F 1/28* (2023.01)
  *C02F 101/30* (2006.01)

(52) U.S. Cl.
  CPC ........ *C02F 1/286* (2013.01); *C02F 2101/308* (2013.01); *C02F 2305/08* (2013.01)

(56) References Cited

FOREIGN PATENT DOCUMENTS

| CN | 108704611 B | 3/2021 |
| CN | 112827511 A | 5/2021 |
| CN | 111871372 B | 7/2022 |

OTHER PUBLICATIONS

Zubair et al, Engineered biochar supported layered double hydroxide-cellulose nanocrystals composite—: Synthesis, characterization and azo dye removal performance, Appendix A: Supplementary data, pp. 1-6 (Year: 2022).*

Mahmoud et al, Decorated Mn-ferrite nanoparticle@Zn—Al layered double hydroxide@Cellulose@ activated biochar nanocomposite for efficient remediation of methylene blue and mercury (II), Biosource Technology 342, pp. 1-11 (Year: 2021).*

Zubair et al, Adsorption and reusability performance of M-Fe (M=Co, Cu, Zn and Ni) layered double hydroxides for the removal of hazardous Eriochrome Black T dye from different water streams, Journal of Water Process Engineering 42, pp. 1-13 (Year: 2021).*

Mukarram Zubair, et al., "Engineered biochar supported layered double hydroxide-cellulose nanocrystals composite—: Synthesis, characterization and azo dye removal performance," Chemosphere, vol. 307, Part 4, Nov. 2022, 7 pages (Abstract only).

Mohamed E. Mahmoud, et al., "Decorated Mn-ferrite nanoparticle@Zn—Al layered double hydroxide@Cellulose@ activated biochar nanocomposite for efficient remediation of methylene blue and mercury (II)", Bioresource Technology, vol. 342, Dec. 2021, 8 pages (Abstract only).

George Lartey-Young, et al., "Optimization, equilibrium, adsorption behaviour of Cu/Zn/Fe LDH and LDHBC composites towards atrazine reclamation in an aqueous environment," Chemosphere, vol. 293, Apr. 2022, 8 pages (Abstract only).

* cited by examiner

BIOCHAR-SUPPORTED LAYERED DOUBLE HYDROXIDE-CELLULOSE NANOCRYSTALS COMPOSITE FOR DYE REMOVAL

STATEMENT OF PRIOR DISCLOSURE BY INVENTOR

Aspects of the present disclosure are described in M. Zubair, H. A. Aziz, I. Ihsanullah, M. A. Ahmad, and M. A. Al-Harthi, "Engineered biochar supported layered double hydroxide-cellulose nanocrystals composite: Synthesis, characterization and azo dye removal performance"; Chemosphere; 2022, 307, 4, 136054, incorporated herein by reference in its entirety.

STATEMENT OF ACKNOWLEDGEMENT

The Authors extend their appreciation to the Deputyship for Research & Innovation, Ministry of Education in Saudi Arabia for funding this research work.

BACKGROUND

Technical Field

The present disclosure is directed to a dye removal composition, particularly, to a biochar-supported layered double hydroxide (LDH), cellulose nanocrystal composite for removing an azo dye from an aqueous solution.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Widespread industrialization such as paper, paints, textiles, cosmetics, leather, food, and pharmaceuticals industries results in organic dye waste, which can then contaminate wastewater and water systems. Negative side effects of dyes on the aquatic environment include an increase in biochemical oxygen demand (BOD) and chemical (COD) oxygen demand, eutrophication, bioaccumulation, water colorization, prevention of photosynthesis, and inhibition of plant growth. In addition, textile dyes can cause allergies, dermatitis, urticaria, DNA damage, and cancer if they enter the human body. As textile dyes have complex aromatic structures, non-biodegradability, and high stability towards heat, light, and chemicals, it is a challenge to remove dyes from water effluents before discharge into the environment.

Existing treatment techniques, such as the Fenton process, membrane separation, coagulation, and bioremediation, have shortcomings, such as high process cost, accumulation of excess sludge during coagulation, accurate control of process parameters, formation of toxic byproducts and low removal efficiency. Considering these limitations, adsorption has been identified as a technique for the efficient treatment of dye-contaminated industrial discharge. Adsorption has benefits including process easiness, cost-effectiveness, and high and rapid removal of dyes from water systems.

Numerous nanostructured materials have been explored to remove hazardous dyes from wastewater effluents. Biochar is a carbonaceous material derived from the pyrolysis of various biowaste feedstocks that have gained attention for treating various hazardous pollutants. The low cost, ease of production, high porosity, and large surface area make it an alternative candidate for adsorption. In general, the biochar surface is negatively charged, and it has more tendency toward the uptake of cations as compared to the anionic organic contaminants attributed to solid electrostatic interactions. Further, the biochar can be engineered through surface modification or intercalation of metal cations onto the biochar matrix. Functionalization of biochar can improve the physical and chemical properties of biochar, resulting in an enhanced affinity towards anionic pollutants compared to un-modified biochar.

Furthermore, layered double hydroxides (LDHs) have also gained attention for applications in water treatment due to their high surface area, facile synthesis methods, and excellent ion exchange capabilities. Biochar-LDH composites have emerged as attractive, sustainable, cost-effective, and promising adsorbents for water purification. The addition of biochar as a low-cost support material for LDHs not only prevents LDHs agglomeration but results in an enhancement in physicochemical characteristics of the resultant composite that facilitates improved treatment of organic and inorganic polluted water systems along with reusability.

The addition of functional material into the composite matrix is also a promising approach to improving adsorption performance. Cellulose nanocrystals (CNC) are crystalline nanocellulose that exhibit excellent mechanical and colloidal stability. Additionally, the enriched surface hydroxyl groups of CNC promote effective distribution with the host matrix associated with H-bonding interaction with composite material.

Accordingly, one object of the present disclosure is to provide a stable, efficient, and low-cost adsorbent with excellent adsorption characteristics and reusability performance for the remediation of dyes from water.

SUMMARY

In an exemplary embodiment, a method of adsorbing a dye from an aqueous solution is described. The method includes contacting a composition with the aqueous solution. At least a portion of the dye adsorbs to the composition. The composition includes biochar, cellulose nanocrystals, and a layered double hydroxide (LDH). The LDH includes Cu and Fe. Particles of the LDH and the biochar at least partially cover an outer surface of the cellulose nanocrystals.

In some embodiments, the composition includes 1-30 wt. % of the cellulose nanocrystals based on a weight of the biochar.

In some embodiments, the composition includes 0.1-9 wt. % of the cellulose nanocrystals, 10-30 wt. % of the biochar, and 65-75 wt. % of the LDH, based on a total weight of the composition.

In some embodiments, the LDH includes Cu and Fe in a ratio range of 10:1 to 1:1.

In some embodiments, particles of the LDH are spherical and have an average diameter of 10-30 nm.

In some embodiments, particles of the cellulose nanocrystals have a rod shape with an average length of 300-900 nanometers (nm), and an average thickness of 10-50 nm.

In some embodiments, the particles of the cellulose nanocrystals form aggregates. The aggregates have an average thickness of 100 to 500 nm.

In some embodiments, the LDH is uniformly distributed on the outer surface of the cellulose nanocrystals.

In some embodiments, the composition is porous, and has an average pore size of 15-20 nm.

In some embodiments, the composition has —$OH_2^+$ on an outer surface.

In some embodiments, the composition has a Brunauer-Emmett-Teller (BET) surface area of 200-280 meter square per gram ($m^2/g$).

In some embodiments, the aqueous solution has a pH of 2-5.

In some embodiments, the aqueous solution has a temperature of 24-30° C.

In some embodiments, the composition has a concentration of 1-10 milligrams per liter (mg/L) in the aqueous solution.

In some embodiments, the dye has a concentration of 40-200 mg/L in the aqueous solution.

In some embodiments, the adsorbing of the dye to the composition reaches an equilibrium in 30-45 minutes.

In some embodiments, the adsorbing of the dye to the composition is through hydrogen bonding and metal complexation with the Cu and Fe.

In some embodiments, the dye is an azo dye.

In some embodiments, the maximum adsorption capacity of the composition is 600-900 milligrams per gram (mg/g).

In another exemplary embodiment, a method of making a composition is described. The method includes heating date palm fronds at a temperature of 600-800° C. for 2 to 6 hours in a nitrogen atmosphere to form biochar. The method further includes mixing the biochar with 1-30 wt. % of cellulose nanocrystals, based on a weight of the biochar, to form a dispersion. The method further includes sonicating the dispersion for 10 to 60 minutes to form a first mixture. The method further includes mixing a Cu salt and an Fe salt at a temperature of 50-70° C. and rotations per minute (rpm) of 600-1,000 to form a second mixture. The method further includes mixing the first mixture and the second mixture at a temperature of 50-70° C. and an rpm of 600-1,000 to form a third mixture. The method further includes adding a base to the third mixture to reach a pH of 9-10 to form a precipitate. The method further includes washing with water and drying the precipitate at a temperature of 50-70° C. to form the composition.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
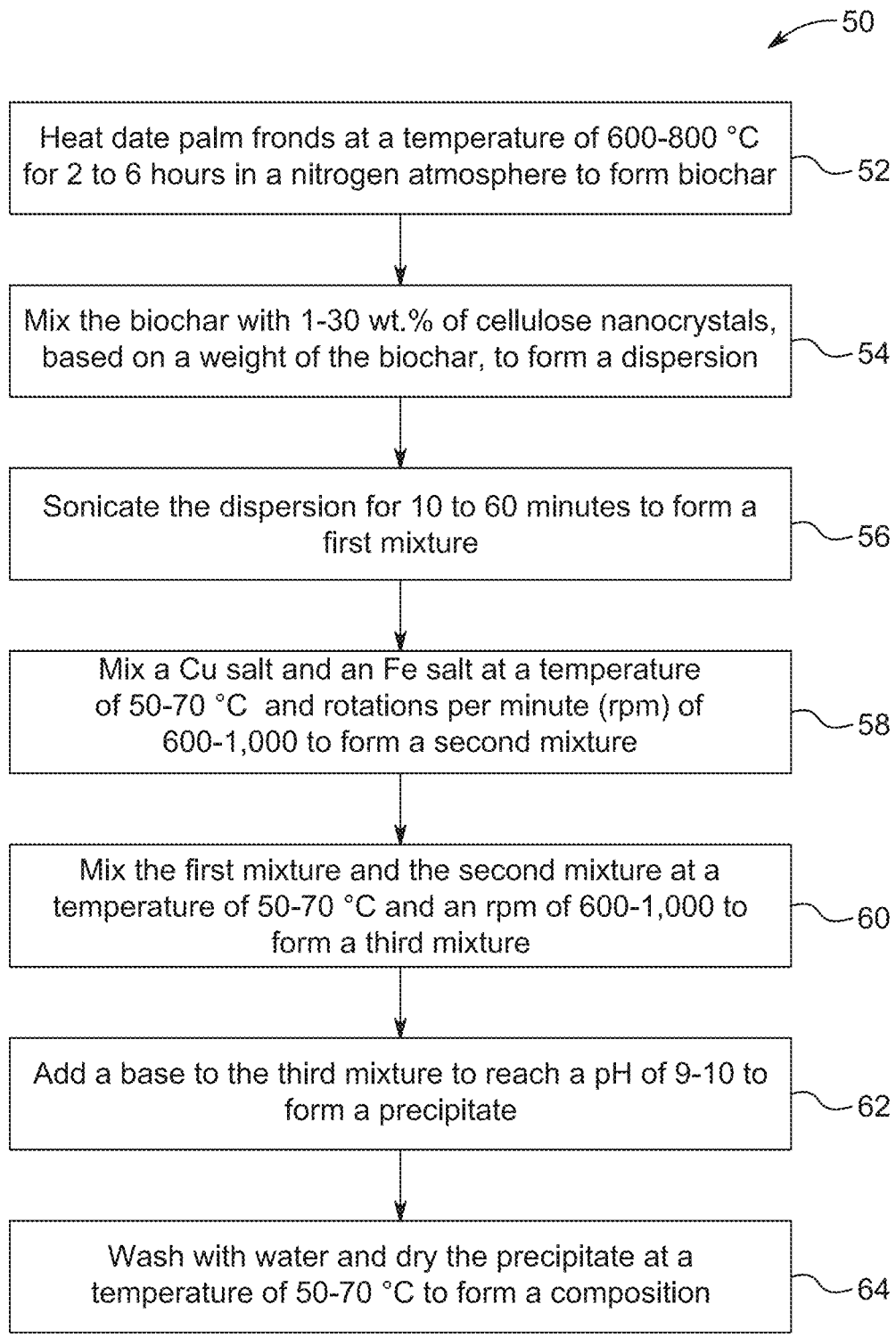
FIG. 1 is a schematic flow chart of a method of making a composition, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Where a numerical limit or range is stated herein, the endpoints are included. Also, all values and subranges within a numerical limit or range are specifically included as if explicitly written out.

As used herein, the term "aqueous solution", refers to a solution in which the solvent is water. Further, as defined herein, "aqueous solution" includes solutions primarily composed of water, or water is the major solvent present in the solution compared to other solvents. The term further includes any of the solutions or mixtures that contain water as a solvent, for example, but not limited to, true solutions, homogenous solutions, heterogeneous solutions or mixtures, colloids, suspensions, emulsions, and super-saturated solutions or mixtures.

Aspects of the present invention are directed toward a method of adsorbing a dye from an aqueous solution. The dye is adsorbed by a composition, also referred to as a composite, or biocomposite throughout the disclosure.

A method for absorbing a dye from an aqueous solution is described. The method includes contacting a composition with the aqueous solution where the composition adsorbs at least a portion of the dye. In some embodiments, the contacting refers to mixing the composition into the solution. The mixing can be by any method known in the art including but not limited to sonicating, mechanical or manual stirring.

The aqueous solution may include at least one ionic species selected from a group consisting of ions of alkali metals, alkaline earth metals, halides, carbonates, nitrates, phosphates, and sulfates. In preferred embodiments, the aqueous solution is not only water and the dye, but also includes other species that would ordinarily be present in wastewater. In some embodiments, the dye-containing aqueous solution may be wastewater from oil, paint, tanning, yarn dying, wastewater treatment, pollutants separation, petrochemical, or other industries that generate aqueous effluents containing dyes. In some examples, the aqueous solution may be wastewater from textile, dying, or tanning industries. In some embodiments, the aqueous solution has a temperature of 20-50° C., preferably 30-40° C., or approximately 35° C. In some embodiments, the aqueous solution has a pH of 2-8, preferably 3-7, 4-6, or approximately 5.

The dye is water-soluble. The water-soluble dyes may be selected from a group consisting of acid dyes, basic dyes, pH indicator dyes, direct dyes, reactive dyes, disperse dyes, azoic dyes, vat dyes, sulfur dyes, indigo dyes, and food dyes. In some examples, the dye is selected from a group consisting of acid dyes, basic dyes, pH indicator dyes, direct dyes, dispersed dyes, azoic dyes, and food dyes. In some embodiments, the dye is selected from a group consisting of methylene orange (methyl orange), methylene blue, methyl red, phenolphthalein, bromothymol blue, congo red, orange II, metanil yellow, chrysoidine G, acid orange 7, acid orange 10, orange G, orange RL, disperse orange 3, and Eriochrome Black T (EBT). In a preferred embodiment, the dye is an azo dye. As used herein, the term 'azo dye' refers to the organic compound bearing the functional group R—N=N—R', in which R and R' are usually aryl and substituted aryl groups. The azo dye may be classified as monoazo dyes, diazo dyes, and polyazo dyes. The azo dye may include, but is not limited to, phenyl azo-ß-naphthol (red dye), methyl orange, phenyl orange dye, methyl red, congo red, chrysoidine, mordant dye, mordant black 17 (Calcon), blue direct dye, direct red dye, and 5-azo-thieno[2,3-d] oxazole dye. In a more preferred embodiment, the dye is EBT. In some embodiments, the aqueous solution contains 0.01-1,000 mg/L, preferably 0.1-100 mg/L, or 1-10 mg/L of the dye. In some embodiments, the dye has a concentration of 40-200 mg/L in the aqueous solution.

In some embodiments, the amount of the composition contacted with the aqueous solution is 1-500 milligrams per liter (mg/L), preferably 50-450 mg/L, 100-400 mg/L, 150-350 mg/L, or 200-300 mg/L. In some embodiments, the composition has a concentration of 1-10 mg/L in the aqueous solution.

The composition includes biochar, cellulose nanocrystals, and a layered double hydroxide (LDH). The combination of these materials forms a composite, also referred to as a biocomposite due to the incorporation of the biochar and cellulose nanocrystals made from natural materials.

Biochar is a lightweight black residue, made of carbon and ashes, remaining after the pyrolysis of biomass. Biochar is made by heating biomass up to 1,200° C. in an oxygen-limited environment. In some embodiments, the biochar can also be produced with raw materials such as grass, cow manure, wood chips, rice husk, wheat straw, and other agricultural residues. Furthermore, the biochar can be produced from residual biomasses such as crop residues, manure, wood residues, and forests and green wastes using modern pyrolysis technology. Agricultural wastes (bark, straw, husks, seeds, peels, bagasse, sawdust, nutshells, wood shavings, animal beds, and corn stalks, etc.), industrial wastes (bagasse, distillers' grain, etc.), and urban and municipal wastes can also be used for the fabrication of the biochar. The biochar can also be obtained from corncobs, cassava rhizomes, and cassava stems. In a preferred embodiment, the biochar of the present disclosure is made from date palm fronds.

Cellulose nanocrystals (CNC) are nanomaterials derived from the most abundant natural polymer, cellulose. Cellulose is composed of β-1,4-linked glucopyranose units that form a linear homopolymer. Each glucopyranose unit bears three hydroxyl groups and thereby cellulose has properties such as hydrophilicity, chirality, and biodegradability. Naturally occurring cellulose has highly ordered, crystalline regions along with some disordered (amorphous) regions in varying proportions, depending on its source. To extract the crystalline regions, cellulose is subjected to a combination of mechanical, chemical, and enzyme treatments, resulting in the formation of CNCs. CNCs are stiff rod-like particles consisting of cellulose chain segments in a crystalline structure. In some embodiments, particles of the cellulose nanocrystals of the present disclosure have a rod shape with an average length of 300-900 nanometers (nm), preferably 400-800 nm, 500-700 nm, or about 600 nm and an average thickness of 10-50 nm, preferably 20-40 nm, or about 30 nm.

LDHs are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A, B) to neutralize that charge, resulting in the structure $[AcBZAcB]_n$. LDHs may be formed with a wide variety of anions in the intercalated layers (Z), such as dodecyl sulfate (DDS) ($CH_3(CH_2)_{11}OSO_3^-$), $Cl^-$, $Br^-$, $NO^{3-}$, $CO_3^{2-}$, $SO_4^{2-}$ and $SeO_4^{2-}$.

An LDH may be synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations. In an embodiment, the divalent ion is selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and/or $Zn^{2+}$, preferably $Cu^{2+}$. In an embodiment, the trivalent ion is selected from the group consisting of $N^{3+}$ is $Al^{3+}$, $Mn^{3+}$, $Cr^{3+}$, $Sc^{3+}$, $Ga^{3+}$, $La^{3+}$, $V^{3+}$, $Sb^{3+}$, $Y^{3+}$, $In^{3+}$, $Co^{3+}$, $Fe^{3+}$ and/or $Ni^{3+}$, preferably $Fe^{3+}$.

In preferred embodiments, the layered double hydroxide is a Cu(II)/Fe(III) layered double hydroxide (CuFe LDH), where some $Cu^{2+}$ in the structure is substituted by $Fe^{3+}$. In an embodiment, a molar ratio of Cu(II) to Fe(III) in the CuFe LDH is from 1:1 to 10:1, preferably 2:1, 3:1, 4:1, 5:1, 6:1, 7:1, 8:1, 9:1, or 10:1.

In an embodiment, the layered double hydroxide component may have a particulate form, for example in the form of spheres, granules, whiskers, sheets, flakes, plates, foils, fibers, and the like. In some embodiments, the layered double hydroxide particles may have a particle size of 10 to 100 nm, preferably 20 to 90 nm, preferably 30 to 80 nm, preferably 40 to 60 nm, preferably about 50 nm. In some embodiments, the layered double hydroxide particles are in the form of spheres with an average diameter of 10-30 nm, preferably 15-25 nm, or about 20 nm.

In some embodiments, the composition includes 1-30 wt. %, preferably 5-25 wt. %, 10-20 wt. %, or about 15 wt. % of the cellulose nanocrystals based on a weight of the biochar. In some embodiments, the composition includes 0.1-9 wt. % of the cellulose nanocrystals, preferably 1-8 wt. %, 2-7 wt. %, 3-6 wt. %, or 4-5 wt. %, 10-30 wt. % of the biochar preferably 15-25 wt. %, or 20 wt. %, and 65-75 wt. % of the LDH, preferably 67-73 wt. %, or about 70 wt. % based on a total weight of the composition.

In the composition, particles of the LDH and the biochar at least partially cover an outer surface of the cellulose nanocrystals. In some embodiments, 20%, 30%, 40%, 50%, 60%, 70%, 80%, or 90% of a surface area of the CNC is covered with biochar and LDH particles. In some embodiments, the CNC is completely enveloped by biochar and LDH particles. In some embodiments, the outer surface of the cellulose nanocrystals is deposited partially or wholly with at least one layer of the particles of the LDH and the biochar in a uniform and continuous manner. In a preferred embodiment, the particles of the LDH and the biochar form a continuous layer on the outer surface of the cellulose nanocrystals. In an embodiment, the particles of the LDH and the biochar form a monolayer on the cellulose nanocrystals. In another embodiment, the particles of the LDH and the biochar may include more than a single layer on the cellulose nanocrystals.

In some embodiments, the LDH is uniformly distributed on the outer surface of the cellulose nanocrystals, in other words, there are no aggregates formed of the LDH particles on the CNC. In some embodiments, the CNC particles are not aggregated. In some embodiments, when an amount of CNC is greater than 10 wt. % of based on a weight of the biochar, the particles of the cellulose nanocrystals form aggregates. In some embodiments, the aggregates have an average thickness of 100 to 500 nm, preferably 200-400 nm or about 300 nm. In this case the average thickness refers to the thickness of the rod shaped CNC particles aligning along their longest axis and forming a bundle of CNC rods. In some embodiments, the composition has $—OH_2^+$ on an outer surface, wherein these groups are available to interact with components in the aqueous solution.

In some embodiments, the composition is porous and has an average pore size of 15-20 nm, preferably 16-19 nm, or 17-18 nm. In some embodiments, the composition has an average pore volume of 0.2-0.3 cm$^3$/g, preferably 0.22-0.28 cm$^3$/g, or 0.24-0.26 cm$^3$/g. In some embodiments, the composition has a Brunauer-Emmett-Teller (BET) surface area of 200-300 meter square per gram (m$^2$/g), preferably 210-290 m$^2$/g, 220-280 m$^2$/g, 230-270 m$^2$/g, or 240-260 m$^2$/g.

Following the contacting of the composition with the aqueous solution, the composition adsorbs at least a portion of the dye. In some embodiments, the composition adsorbs preferably 50%, 60%, 70%, 80%, 90%, or 100% of the dye. In some embodiments, the adsorbing of the dye to the composition reaches an equilibrium in 30-45 minutes, preferably 35-40 minutes. In some embodiments, the adsorbing of the dye to the composition is through hydrogen bonding and metal complexation with the Cu and Fe. In some embodiments, the maximum adsorption capacity of the composition is 600-900 milligrams per gram (mg/g), preferably 700-800 mg/g or about 750 mg/g. As used herein, the term 'adsorption capacity' refers to the amount of adsorbate taken up by an adsorbent per unit mass (or volume) of the adsorbent.

While not wishing to be bound to a single theory, it is thought that the fast and high adsorption of the dye onto the composition is associated with a multi-adsorption mechanism, involving electrostatic attraction, hydrogen bonding, chemical metal complexation, anion exchange, and surface adsorption. Specifically, the positively charged hydroxyl groups ($—OH_2+$) on the biocomposite surface rapidly interact with negatively charged groups of the dye via electrostatic attraction. As a result, the anionic dye species are exchanged by OH anions and form a strong interface with surface active metal oxides in the LDH (for example Cu—O and Fe—O) via metal complexation and hydrogen bonding. In addition, the highly porous and hydrophilic surface due to the presence of CNCs also promote trapping of the dye via an external surface adsorption mechanism. Therefore, the three materials present in the biocomposite work together synergistically to form an effective adsorption material.

FIG. 1 illustrates a schematic flow chart of a method 50 of making the composition. The order in which the method 50 described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes heating date palm fronds at a temperature of 600-800° C., more preferably 650-750° C., and yet more preferably 700° C. for 2 to 6 hours, more preferably 3.5 to 4.5 hours, and yet more preferably 4 hours, in a nitrogen atmosphere to form the biochar. The date palm fronds can be heated using heating appliances such as ovens, microwaves, autoclaves, hot plates, heating mantles and tapes, oil baths, salt baths, sand baths, air baths, hot-tube furnaces, and hot-air guns. Any inert atmosphere such as Argon is also acceptable.

At step 54, the method 50 includes mixing the biochar with 1-30 wt. %, more preferably 4-26 wt. %, and yet more preferably 5-25 wt. %, of cellulose nanocrystals, based on the weight of the biochar, to form a dispersion. As used herein, the term 'dispersion' refers to the system in which distributed particles of one material are dispersed in a continuous phase of another material. The two phases may be in the same or different states of matter. The dispersion can be a molecular dispersion or a coarse dispersion.

At step 56, the method 50 includes sonicating the dispersion for 10 to 60 minutes, more preferably 25 to 35 minutes, and yet more preferably 30 minutes, in a frequency range of 45 to 55 kilohertz (kHz), more preferably 50 kHz, to form a first mixture. As used herein, the term 'sonication' refers to the process of applying sound energy to agitate particles or discontinuous fibers in a liquid.

At step 58, the method 50 includes mixing a Cu salt and an Fe salt at a temperature of 50-70° C., more preferably 60-68° C., and yet more preferably 65° C., and rotations per minute (rpm) of 600-1,000, and more preferably 800-1,000, to form a second mixture. The Cu salt and the Fe salt may be present in a mole ratio of 10:1 to 1:1. In some embodiments, the Cu and Fe salts are nitrate, sulfate or carbonate salts.

At step 60, the method 50 includes mixing the first mixture and the second mixture at a temperature of 50-70° C., more preferably 60-68° C., and yet more preferably 65° C., and an rpm of 600-1,000, and more preferably 800-1,000 to form a third mixture.

At step 62, the method 50 includes adding a base to the third mixture to reach a pH of 9-10, more preferably 9.5, to form a precipitate. The base may be selected from the group consisting of an alkaline earth metal hydroxide such as beryllium hydroxide (Be(OH)$_2$), magnesium hydroxide (Mg(OH)$_2$), strontium hydroxide (Sr(OH)$_2$), and calcium hydroxide (Ca(OH)$_2$) and an alkali metal hydroxide such as lithium hydroxide (LiOH), sodium hydroxide (NaOH), potassium hydroxide (KOH) and rubidium hydroxide (RbOH), and cesium hydroxide (CsOH). In a preferred embodiment, the base is sodium hydroxide (NaOH).

At step 64, the method 50 includes washing with water and drying the precipitate at a temperature of 50-70° C., more preferably 58-62° C., and yet more preferably 60° C., for about 45-50 hours, more preferably 48 hours to form the composition. In some embodiments, the precipitate washed with water may further be washed with ethanol. The precipitate can be dried by using heating appliances such as ovens, microwaves, autoclaves, hot plates, heating mantles and tapes, oil baths, salt baths, sand baths, air baths, hot-tube furnaces, and hot-air guns.

EXAMPLES

The following examples describe and demonstrate exemplary embodiments of the method 50 described herein. The examples are provided solely for the purpose of illustration and are not to be construed as limitations of the present disclosure, as many variations thereof are possible without departing from the spirit and scope of the present disclosure.

Example 1: Materials Required

Metal precursor salts (Cu(NO$_3$)$_2$·3H$_2$O and Fe(NO$_3$)$_3$·9H$_2$O and other chemicals such as hydrochloric acid, ethanol, and sodium hydroxide were procured from Merch Co. (Germany) and Sigma Aldrich Co. (USA). The EBT dye was purchased from Merch Co. (Germany). Cellulose nanocrystals (CNC) were acquired from CelluForce Inc (Canada).

Example 2: Preparation of B—CuFe Layered Double Hydroxide-Cellulose Nanocrystal Biocomposites The biocomposites were synthesized via ultrasonicated assisted co-precipitation technique. Firstly, biochar, produced from date palm frond waste pyrolyzed at 700° C. for 4 hours and CNC (5-25 wt. % by weight of biochar) were weighed according to Table 1. The samples are labeled as biochar (B)—CuFe LDH (CuFe)-cellulose nanocrystals (CNC). The labels also include the relative amount of the CNC in the composite.

TABLE 1

Mass composition (w/w) of the B—CuFe—CNC composites

| Sample | Biochar (B) (g) | CNC (g) | CuFe (2:1) salts (g) |
|---|---|---|---|
| B—CuFe—CNC (5%) | 2.5 | 0.125 | 4.82:4.04 |
| B—CuFe—CNC (10%) | 2.5 | 0.25 | 4.82:4.04 |
| B—CuFe—CNC (15%) | 2.5 | 0.325 | 4.82:4.04 |
| B—CuFe—CNC (20%) | 2.5 | 0.5 | 4.82:4.04 |
| B—CuFe—CNC (25%) | 2.5 | 0.625 | 4.82:4.04 |

The biochar-CNC mixture was transferred to 100 mL of de-ionized water and subjected to ultrasonication (50 KHz frequency) for approximately 30 minutes (5 seconds(s) on and 5 s off). At the same time, layered double hydroxide salts ($Cu^{2+}:Fe^{3+}$) of mole ratio 2:1 (4.82:4.04) g were weighed and transferred to a reaction flask (500 mL). LDH salt mixture was agitated for 15 minutes at high rpm (>800) and maintained at 65° C. temperature. Next, the ultrasonicated biochar-CNC was added to a reaction mixture containing LDH salts with continuous magnetic stirring at ≥800 rpm and 65° C. The co-precipitation reaction started with a gradual increase of pH to 9-9.5 using 1 molar (M) NaOH solution. After maintaining the final pH of 9.5, the mixture was refluxed overnight at 65° C. The precipitate of the biocomposites was centrifuged, washed many times with DI water, and finally with analytical grade ethanol to get rid of unreacted salts and NaOH completely. The resultant biocomposites were dried in an oven for 48 hours at 60° C. The dried samples are kept safely in sealed bottles for characterization and adsorption studies.

Example 3: Characterization Techniques

The surface functionalities of the biocomposites were characterized by Fourier transform infrared spectroscopy (FT-IR) using Thermofischer, Nicolet (manufactured by 168 Third Avenue. Waltham, MA USA 02451), measured from a wavenumber range 400-4000 $cm^{-1}$. The crystallographic structure of the biocomposite was analyzed by X-ray diffraction (XRD) (Rigaku) (2601A, Tengda Plaza, No. 168, Xizhimenwai Ave), at wavelength=1.54 angstrom (Å), and 2 theta (degree) of 50-80°. The textural characteristics were characterized through N2 adsorption-desorption isotherm using Brunauer Emmett Teller (BET) (Quantachrome, Nova 1200e, USA) (manufactured by 1900 Corporate Dr, Boynton Beach, Florida, 33426, United States). Scanning electron microscopy (SEM) and energy-dispersive X-ray spectroscopy (EDS) (Tescan mira 3) (21 623 00 Brno-Kohoutovice Czech Republic) are employed to characterize the surface morphology of the biocomposites. X-ray photoelectron spectroscopy (XPS) technique was employed for analyzing the quantitative measurement of the biocomposite surface functional groups using Axis ultra DLD, Kratos, XPS instruments (Trafford Wharf Rd, Trafford Park, Stretford, Manchester M17 1GP, United Kingdom).

Example 4: Adsorption Studies

Adsorption was carried out in a batch mode using a temperature-controlled Thermo fisher shaker (manufactured by Thermo Fisher, Waltham, MA, USA). Initially, a preliminary adsorption experiment was conducted by shaking precisely 5 milligrams (mg) of biocomposite containing 100 mg/L of EBT dye solution in a 50 mL flat-bottom propylene vessel under the following experimental conditions: pH=2-8, shaking time=360 minutes and temperature=25° C. The EBT concentration was measured at a 530 nm maximum wavelength using a spectrophotometer. The adsorption experiments are performed in duplicates, and the average values are mentioned in the results and discussion section.

The EBT dye adsorption (qe (mg/g)) and EBT percentage removal of the biocomposites were calculated through equations. (1) and (2), respectively.

$$qe = \frac{(C_0 - C_e)V}{W}, \quad (1)$$

$$\% \text{ removal} = \frac{(C_0 - C_e)}{C_e} \times 100, \quad (2)$$

where $C_0$ (mg/L), Ce (mg/L), and qe (mg/g) represent the initial EBT concentration, equilibrium EBT concentration and EBT adsorption capacity of the biocompoistes, respectively. W (g) and V (L) indicate the weight of biocomposite and volume of the EBT dye solution.

Example 5: Response Surface Methodology (RSM) Using Box Behnken Design (BBD)

Adsorption response including EBT % removal and adsorption potential of biocomposite (qe) by investigating adsorption process conditions such as solution initial pH of solution ranging from 2 to 8, EBT dye initial concentration from value 40-200 mg/L, biocomposite amount from 5 to 15 mg and adsorption temperature (25-45° C.) was achieved by 3-level BBD (Table 2).

TABLE 2

Experimental range and levels in the BBD

| Variables | Symbol | — | 1 | 0 | 1 |
|---|---|---|---|---|---|
| Initial pH | A | 2 | null | 5 | 8 |
| Initial concentration (mg/L) | B | 40 | null | 120 | 200 |
| Adsorbent dosage (mg) | C | 5 | null | 10 | 15 |
| Temperature (° C.) | D | 25 | null | 35 | 45 |

The other adsorption parameters, such as adsorption agitation time and speed, were maintained constant at 6 hours and 275 rpm, respectively. The adsorption experimentation was conducted in duplicates at the central values of adsorption parameters to assess reproducibility and errors. Additionally, the experiments were carried out randomly to obtain highly credible adsorption data, which reduces the influence of unpredicted elements. For evaluation of the biocomposite and adsorption process, the levels of independent variables (pH, dosage, dye concentration, and temperature) are listed in Table 2. The generalized RSM model equation (3) was utilized to fit the adsorption data using Design-Expert version 11 (Trial version).

$$y = \beta_0 + \sum_{i=1}^{k} \beta_i x_i + \sum_{i=1}^{k} \beta_{ii} x_i^2 + \sum_{i=1}^{k-1} \sum_{j=2}^{k} \beta_{ij} x_i x_j + \varepsilon, \quad (3)$$

where y=predicted response, $\beta_0$, $\beta_i$, $\beta_{ij}$, $\beta_{ii}$=constant, linear, interaction and quadratic coefficients, and $x_i$, $x_j$=experimental values of the independent variables (coded).

Example 6: Modeling Studies

EBT sorption results were applied to the kinetic, isotherm and thermodynamic linear models to elucidate the possible dye interaction mechanism with the biocomposite. For kinetic modeling, the most widely used kinetic models, such as diffusion models, pseudo-first order, and pseudo-second-order models, have fitted to adsorption kinetic results at two different concentrations and contact time (0-360 minutes). The equilibrium adsorption results were fitted to the isotherm models (Langmuir, Freundlich, Redlich Peterson, and Dubinin-Radushkevich). The thermodynamic investigation was conducted at 25-45° C. to measure the thermodynamic parameters and support the dye adsorption behavior onto the biocomposite.

Example 7: Co-Existing Anions and Reusability Studies

The adsorbent must efficiently uptake dye contaminants in a competitive ions environment for potential industrial applications and maintain excellent reusability performance. Therefore, the influence of competing anions ($Cl^-$, $NO_3^-$, $CO_3^{2-}$ and $SO_4^{2-}$), on the EBT adsorption performance of biocomposite was examined. Different concentrations (0-0.25 mol/L) of anions ($Cl^-$, $NO_3^-$, $CO_3^{2-}$ and $SO_4^{2-}$) were mixed with the EBT dye (100 mg/L) solution. The solution containing approximately 100 mg of the biocomposite was agitated for 6 hours at a fixed temperature of 25° C. Regeneration spent B—CuFe-CNC biocomposite was evaluated using three reagents (NaOH (0.1 and 0.5 M) and ethanol).

First, the EBT adsorption was performed using 0.1 g of the B—CuFe-CNC biocomposite in 100 mL of the EBT dye solution (100 mg/L) for 360 minutes at 25° C. Next, dye-saturated B—CuFe-CNC biocomposite was separated through centrifugation (5 minutes and 4000 rpm). Then, the desorption study was done by taking 0.1 g of the dye-saturated B—CuFe-CNC biocomposite with 200 mL of regeneration solvent (ethanol or sodium hydroxide) and agitating for 6 hours at 25° C. The regenerated biocomposite was centrifuged and washed several times with deionized water and dried in the oven at 80° C. for reuse in the second cycle. The adsorption-desorption experiments were performed for six consecutive cycles to demonstrate the recyclability potential of the B—CuFe-CNC biocomposite.

Example 8: Characterization of Biocomposites

The effect of CNC loading on the physicochemical properties (surface structure, surface functional groups, crystallinity, crystal size, thermal stability, and chemical structure) of B—CuFe LDH was assessed using various characterization techniques, and their results are demonstrated as follows.

Figure 2A:
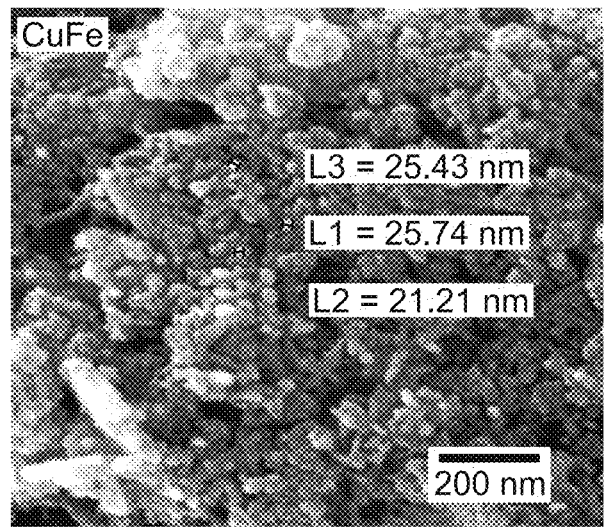
FIG. 2A is a scanning electron microscopy (SEM) image of CuFe LDH, according to certain embodiments.
Figure 2B:
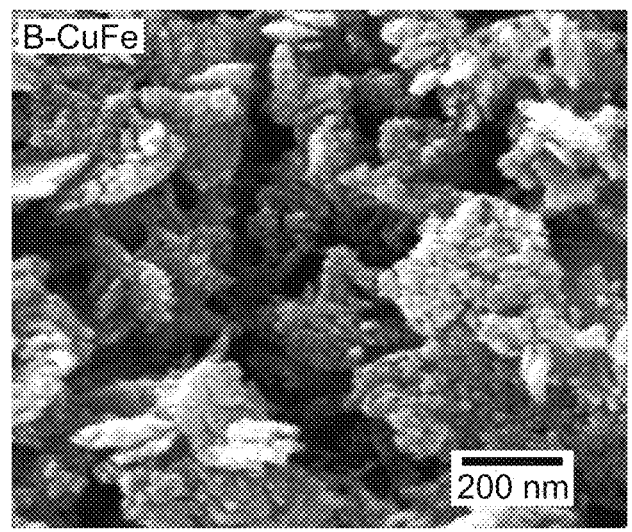
FIG. 2B is an SEM image of biochar CuFe composite (B—CuFe), according to certain embodiments.
Figure 3A:
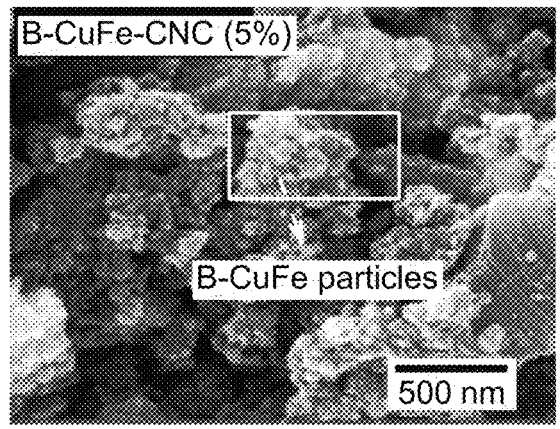
FIGS. 3A-3D depict SEM images of various biochar CuFe cellulose nanocrystal (B—CuFe-CNC) biocomposites, according to certain embodiments.
Figure 3B:
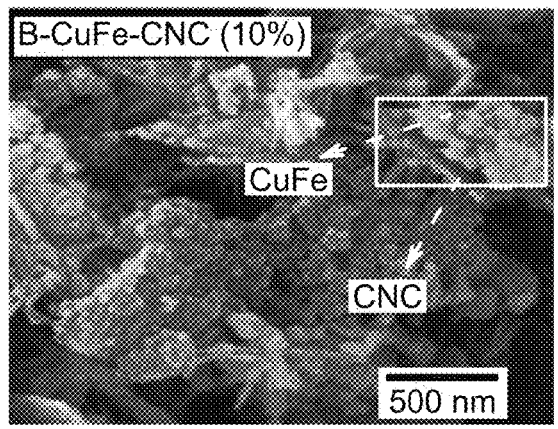
Figure 3C:
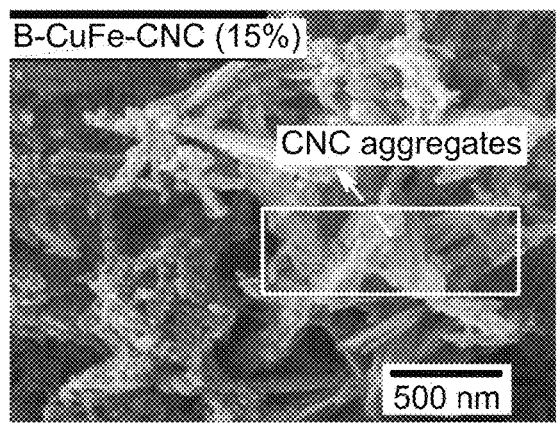
Figure 3D:
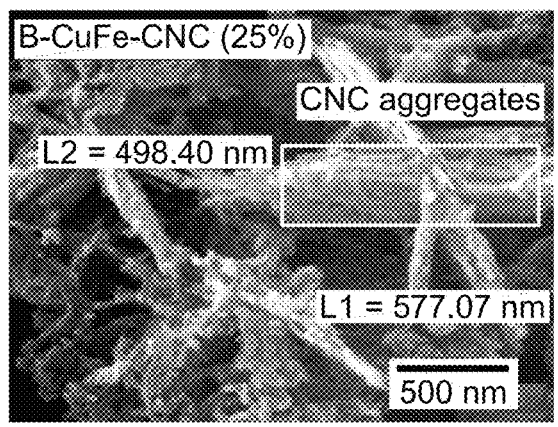
Figure 4A:
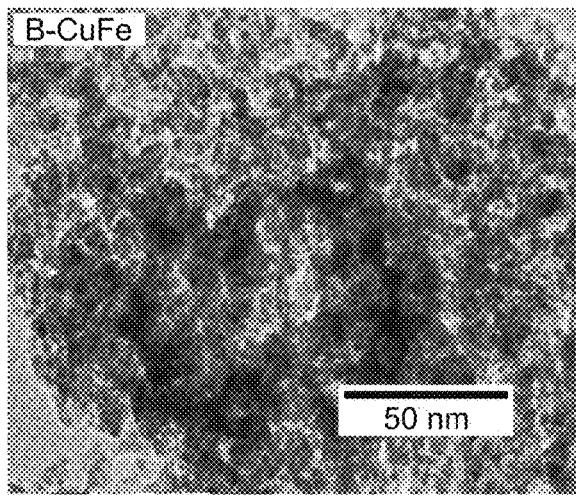
FIG. 4A depicts a transmission electron microscopy (TEM) image of the B—CuFe, according to certain embodiments.
Figure 4B:
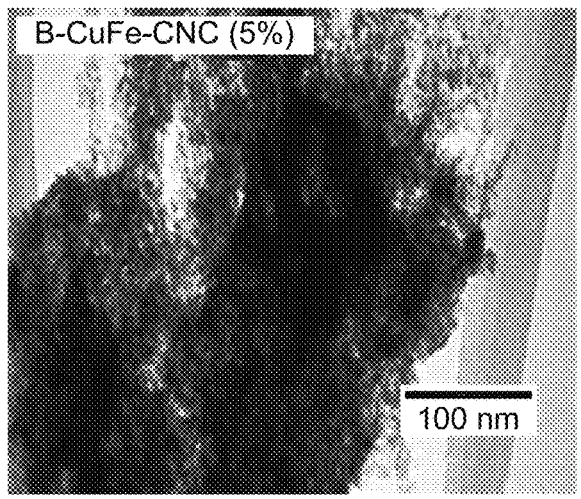
FIGS. 4B-4D depict TEM images of various B—CuFe-CNC biocomposites, according to certain embodiments.
Figure 4C:
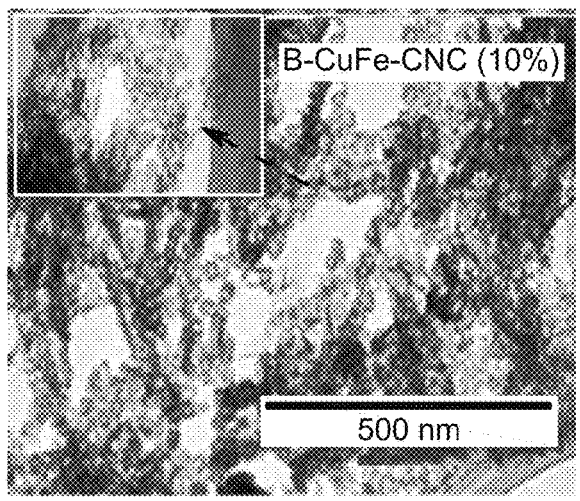
Figure 4D:
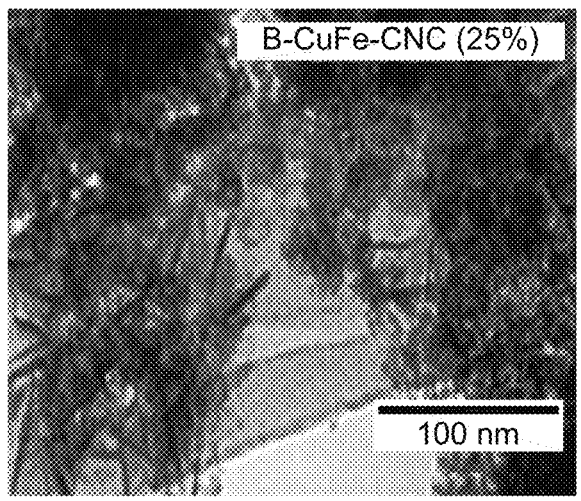

The surface morphology of CuFe LDH, B—CuFe, and B—CuFe-CNC biocomposites are displayed in FIGS. 2A-2B and FIGS. 3A-3D, respectively. The CuFe LDH exhibited spherical shape microparticles of varied sizes in the range of 20-25 nm (FIGS. 2A-2B). The surface of the B—CuFe biocomposite displayed a porous and discrete pattern consisting of micro spherical particles of CuFe LDH surrounded homogeneously on the surface of biochar.

As seen in FIG. 3A-FIG. 3D, the B—CuFe-CNC (5%) biocomposite exhibits almost similar morphology to the B—CuFe layered double hydroxide composite. This is attributed to the small amount of CNC present in B—CuFe LDH structure that does not majorly affect the surface structure of the B—CuFe LDH. However, further addition of CNC (i.e., 10-25%) unexpectedly alters the surface structure of the biocomposite. The SEM images showed changes in surface morphology that turned into a rod-like structure with an increase in the percentage of the CNC (10-25%) in the B—CuFe-CNC biocomposites. For instance, the B—CuFe-CNC biocomposite containing 10% CNC changed to a highly porous, rough, and 2-dimensional structure. This indicates that the homogenous decoration of the CuFe LDH and the biochar tiny particles within rod-like CNC particles resulted in a platform for the adsorption of anionic dye molecules. The interactions of the three components for an unexpected structure with a different morphology than the three individual components.

The increased loading of the CNCs onto the B—CuFe composite shows that the CNC is randomly entangled and partially decorated with the B—CuFe LDH. As seen, higher CNC loading (25%) onto the B—CuFe-CNC biocomposite has resulted in the formation of the CNC aggregates that are distributed on the entire surface of the biocomposite. This agglomeration of the CNC reduces the surface area and crystallinity of the biocomposite, as illustrated in BET and XRD results, respectively.

The incorporation of the CNC on the surface structure of the biocomposite was further evaluated using TEM analysis (FIGS. 4A-4D). As seen from the TEM images, the surface morphology of the B—CuFe and the B—CuFe-CNC (5%) biocomposite exhibited almost similar morphology with no noticeable difference after the addition of the CNC. This is attributed to a small amount of the CNC (5 wt. %) on the B—CuFe-CNC biocomposite. Unexpectedly, as the amount of the CNCs increased to 10 wt. %, the B—CuFe-CNC (10%) structure transformed into a 2-dimensional rod-like porous structure. As a result, the B—CuFe-CNC (10%) biocomposite showed the surface appearance of completely enveloped CNC between biochar and CuFe LDH nanoparticles. The porous 2D dimensional structure will provide a larger platform for the EBT molecules to be easily trapped by biochar and CuFe LDH surface functional groups. In addition, a higher percentage of the CNC (25 wt. %) in the B—CuFe-CNC (25%) caused the aggregation of the CNCs, which reduced the crystallinity and surface area of the biocomposite as confirmed by XRD and BET results.

Figure 5A:
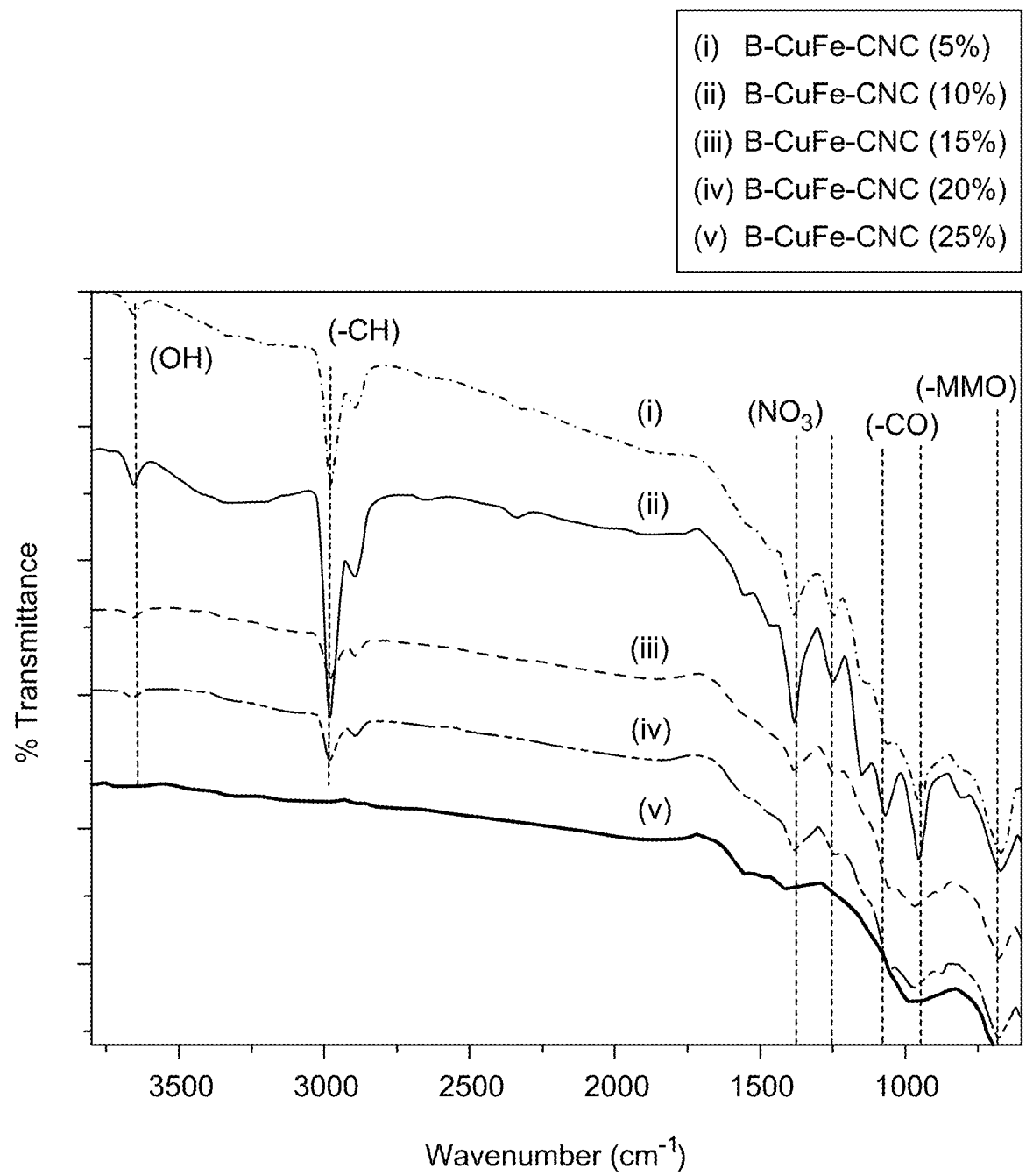
FIG. 5A depicts Fourier Transform Infrared Spectroscopy (FT-IR) of various B—CuFe-CNC biocomposites, according to certain embodiments.

The surface functionalities of the B—CuFe-CNC biocomposites were analyzed using FT-IR, and the respective spectra are displayed in FIG. 5A. The characteristic band at around 3460 $cm^{-1}$ and 2950 $cm^{-1}$ corresponded to the stretching vibrations of —OH and CH groups, respectively. In all the spectra, peaks were observed at 1100-1020 $cm^{-1}$, corresponding to C—O and C—O—C vibrations. The stretching vibrations of —$SO_3H$ groups associated with C—S and S—O are observed at 1230 $cm^{-1}$ and are typically due to the presence of CNC. In B—CuFe-CNC (5 and 10%) spectrum, the peak at 1350 $cm^{-1}$ is associated with $NO_3$ groups that appeared from the CuFe LDH structure. Moreover, peaks corresponding to oxides of Cu and Fe metal cations (Cu—O or Fe—O) confirm the effective decoration of the CuFe LDH nanoparticles on the biochar and CNC surfaces. The B—CuFe-CNC (5%) and B—CuFe-CNC (10%) biocomposites showed stronger characteristic peaks of the CuFe LDH than other B—CuFe-CNC biocomposites. This implies effective and uniform decoration of the CuFe LDH layers onto the biochar and CNC surface.

Figure 5B:
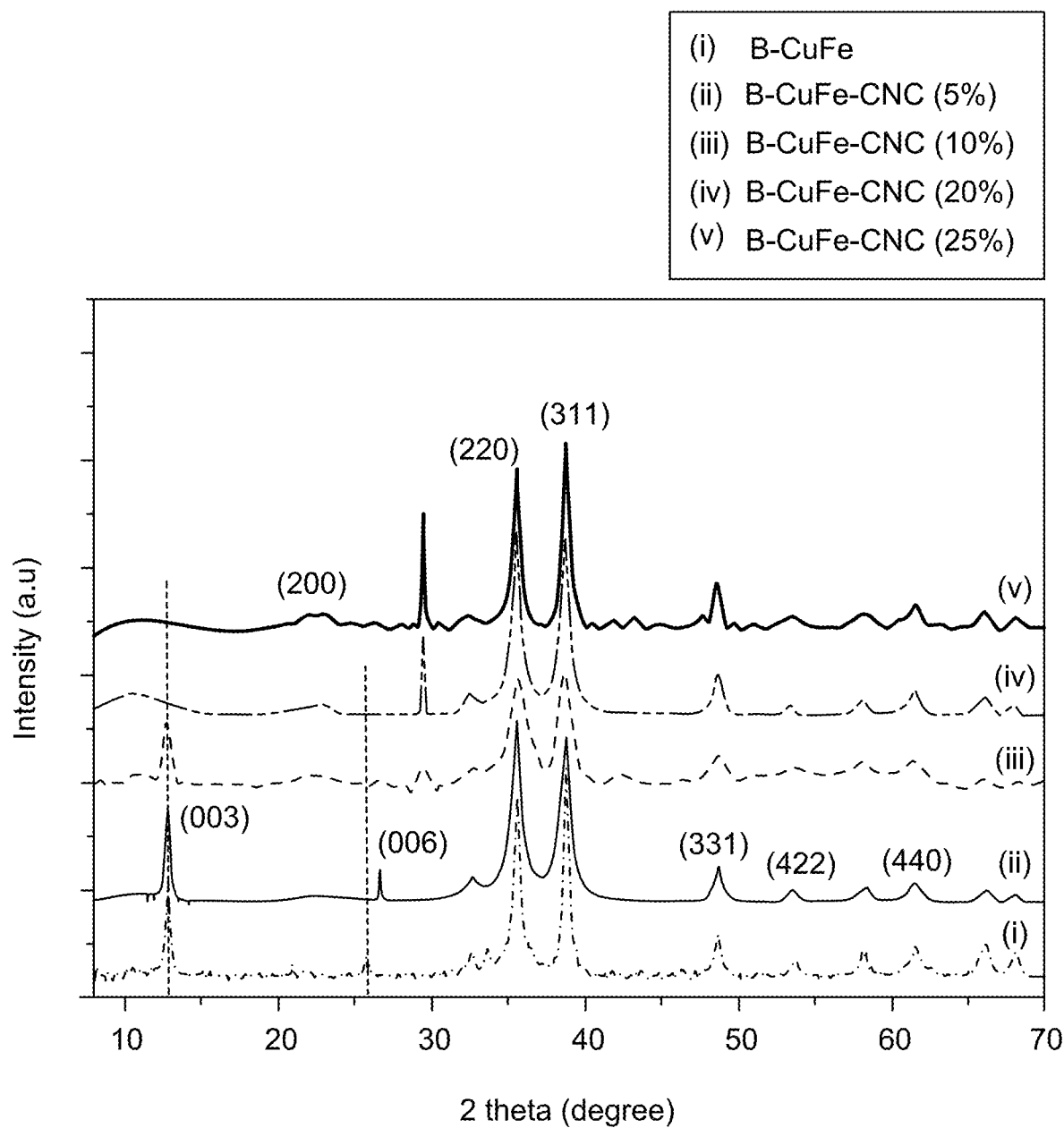
FIG. 5B depicts X-ray diffraction (XRD) patterns of B—CuFe and various B—CuFe-CNC biocomposites, according to certain embodiments.

The crystallographic structure of the biocomposites measured by XRD is shown in FIG. 5B. As seen, the B—CuFe, B—CuFe-CNC (5%) biocomposites showed all characteristic peaks at 2 theta=12.12° (003), 26.72° (006), 35.60° (220), 36.49° (311), 43.24° (331), 50.18° (422), 61.54° (440) attributed to the CuFe LDH crystal structure. This implies that B—CuFe-CNC (5%) biocomposites exhibited a high crystalline region of the CuFe LDH. However, with higher CNC loading (10-25%), the characteristic crystalline peak of the LDH at 12.12° (003) is reduced to lower intensity or disappears. Similarly, the crystalline peak at 26.72° (006) shifted to 29.52°. This is associated with the interaction of the CNC particles with the CuFe LDH layers. Additionally, the broad peak observed at 2 theta=22.3° (200) corresponds to the crystalline domain of CNC. The intensity band of the CNC increased with the increase in the amount of the CNC in the B—CuFe-CNC biocomposites. The average crystal size of the B—CuFe and the B—CuFe-CNC (5-25%) biocomposites estimated using the Scherrer equation is summarized in Table 3.

B—CuFe-CNC biocomposites with 5 and 10% CNC loading, than that of the B—CuFe-CNC biocomposites with 15 and 25% CNC loading that exhibited a weight loss of 9-9.5%. This indicates that biocomposite containing 5-10 wt % of CNC possess excess MMO, whereas an increased percentage of the CNC (15-25%) causes restriction of MMO formation and lowered the crystalline region of the biocomposite, as illustrated in XRD results (FIG. 5B).

Figure 6A:
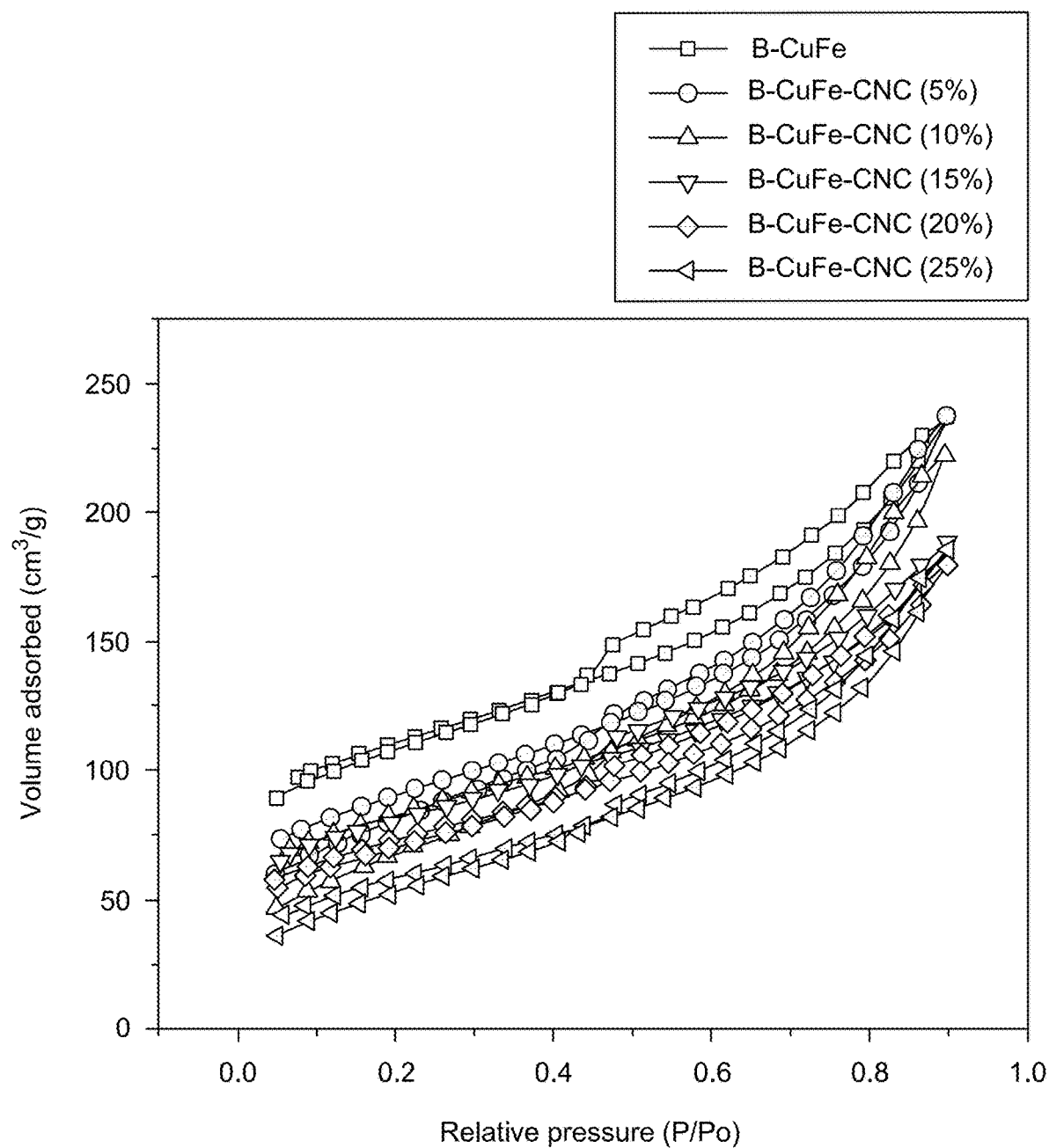
FIG. 6A depicts $N_2$ adsorption-desorption isotherm curve of B—CuFe and various B—CuFe-CNC biocomposites, according to certain embodiments.

The characteristics of the B—CuFe and B—CuFe-CNC biocomposites are shown in Table 3. The results showed that the $N_2$ adsorption-desorption isotherm (FIG. 6A) of all the biocomposites indicated a hysteresis loop of type IV. This implies that the biocomposites exhibit mesoporous material characteristics. In addition, Table 3 displays that the increasing percentage of the CNC in the B—CuFe-CNC biocomposite has caused the reduction of the surface area of the biocomposite. For example, a decrease in surface area from 297.89 to 275.85 $m^2/g$ was observed with increasing the CNC loading from 5 to 10% in the B—CuFe-CNC. However, at higher CNC loading of 25%, the surface area of the biocomposite is substantially decreased to 203.47 $m^2/g$, which is attributed to the agglomeration of CNC within B—CuFe layers.

TABLE 3

Properties of the B—CuFe—CNC biocomposites.

| | | | Samples | | | |
|---|---|---|---|---|---|---|
| | B—CuFe | B—CuFe—CNC (5%) | B—CuFe—CNC (10%) | B—CuFe—CNC (15%) | B—CuFe—CNC (20%) | B—CuFe—CNC (25%) |
| S{BET} ($m^2/g$) | 297.89 | 297.68 | 275.85 | 266.07 | 247.04 | 203.47 |
| Average-pore volume ($cm^3/g$)-BJH | 0.256 | 0.286 | 0.204 | 0.278 | 0.207 | 0.245 |
| Average pore radius (nm)-BJH | 12.5 | 16.9 | 17 | 17 | 18.3 | 19.6 |
| Average crystallite size (nm) (XRD) | 20.38 | 17.45 | 16.59 | 16.86 | 18.22 | 19.93 |

The results showed that at low CNC loading (5-10%) in the biocomposites, the average crystal size reduced from 20.38 nm to 16.59 nm, associated with the presence of the CNC of particle size of 5 nm. However, the presence of the CNC amount >15% showed an increase in the crystal size of biocomposites which is mainly attributed to the entanglement of CNC particles in biocomposites.

Figure 5C:
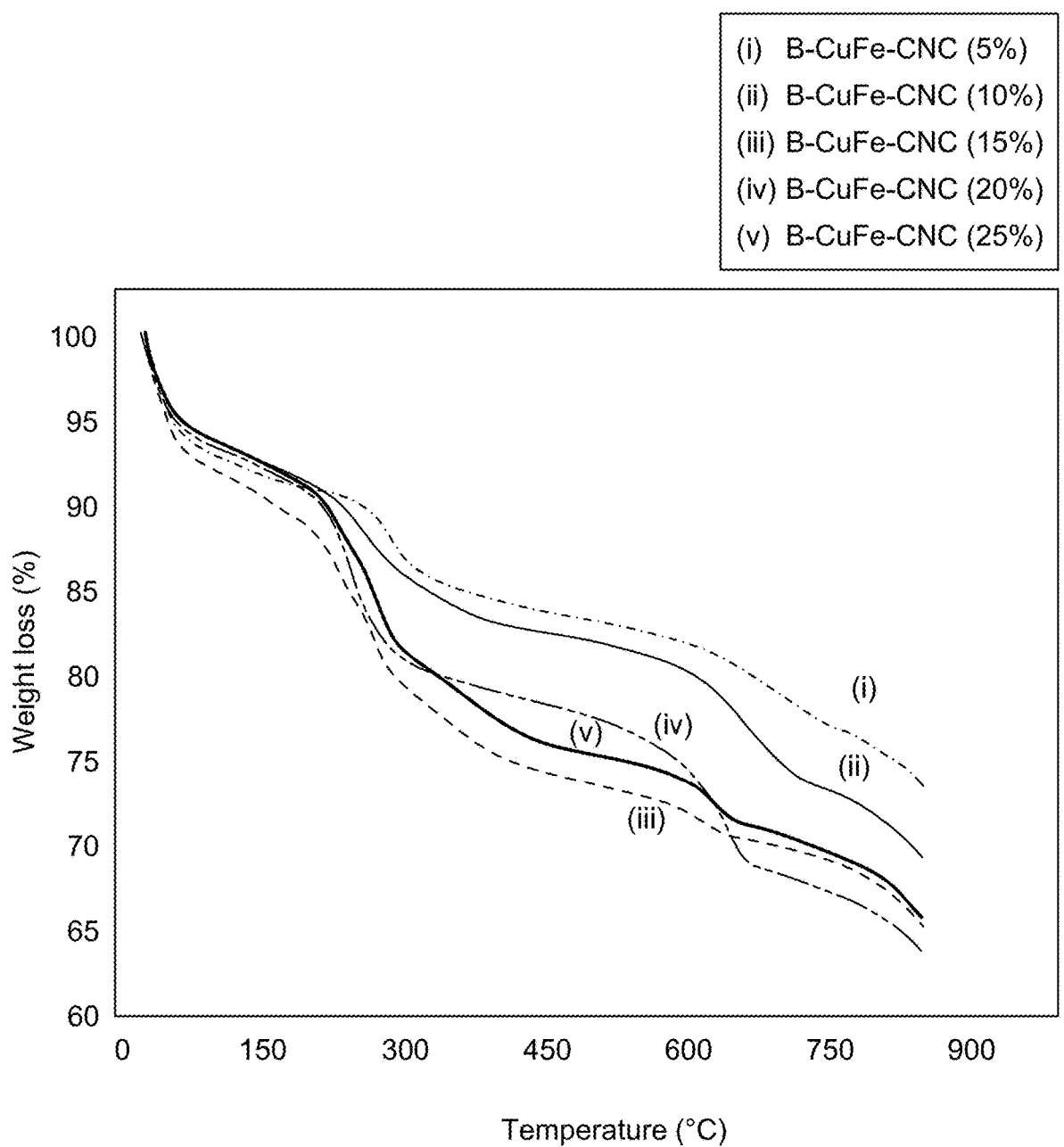
FIG. 5C depicts thermogravimetric analysis (TGA) of various B—CuFe-CNC biocomposites, according to certain embodiments.
Figure 6B:
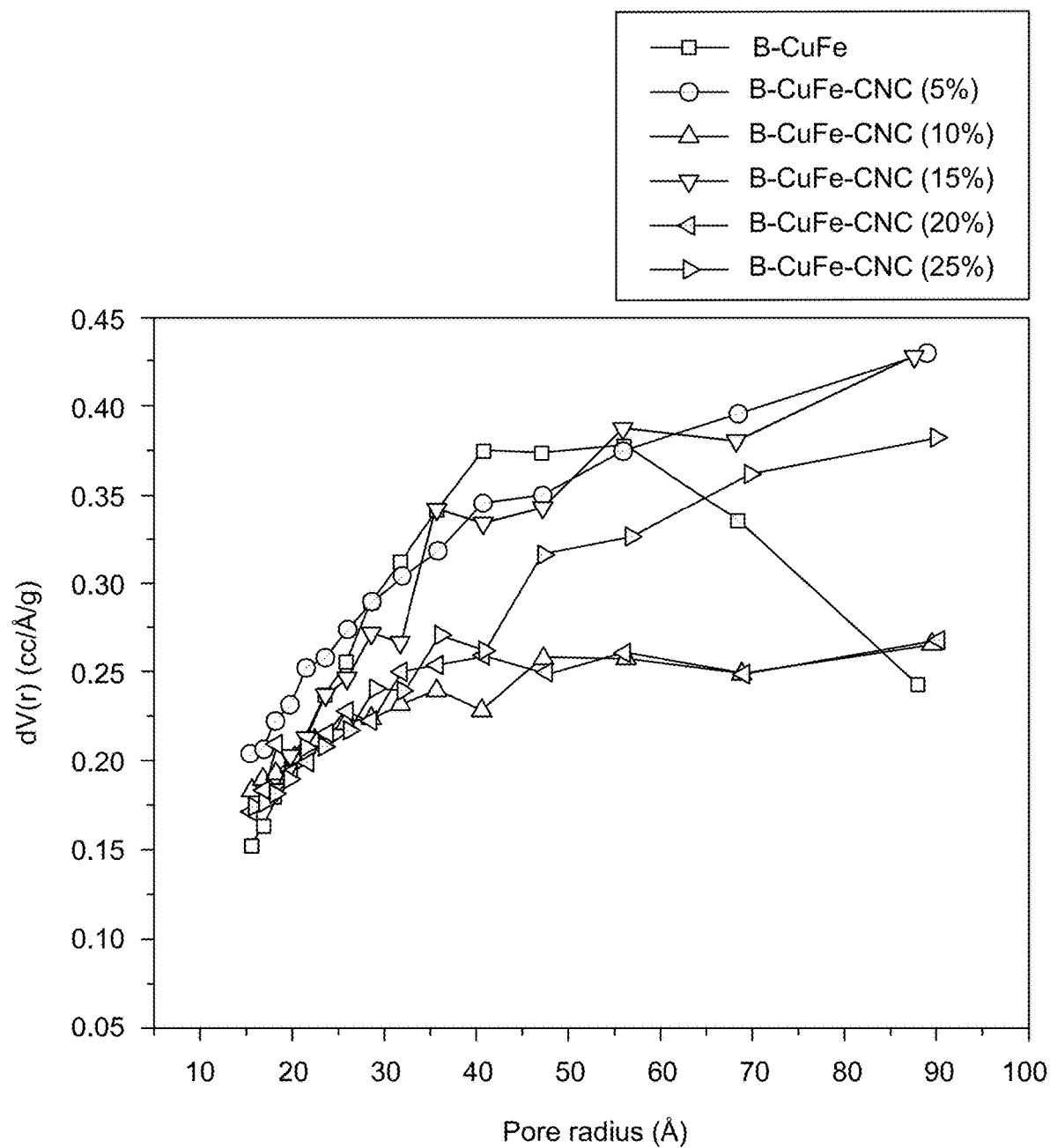
FIG. 6B depicts pore size distribution of B—CuFe and various B—CuFe-CNC biocomposites, according to certain embodiments.
Figure 7A:
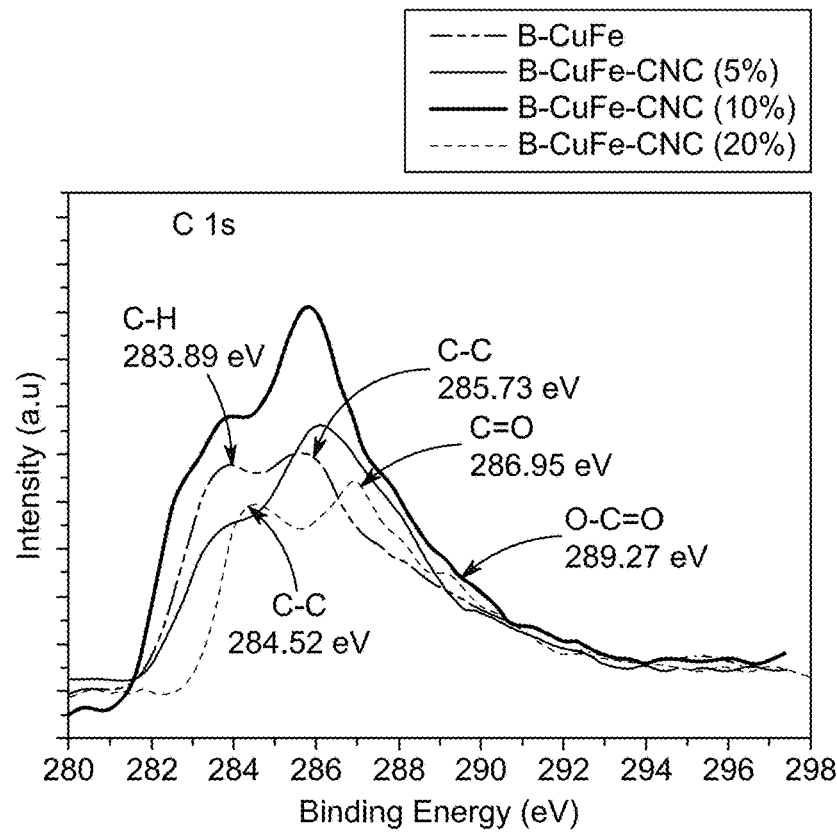
FIG. 7A depicts C 1s X-ray photoelectron spectroscopy (XPS) spectrum of B—CuFe and various B—CuFe-CNC biocomposites, according to certain embodiments.
Figure 7B:
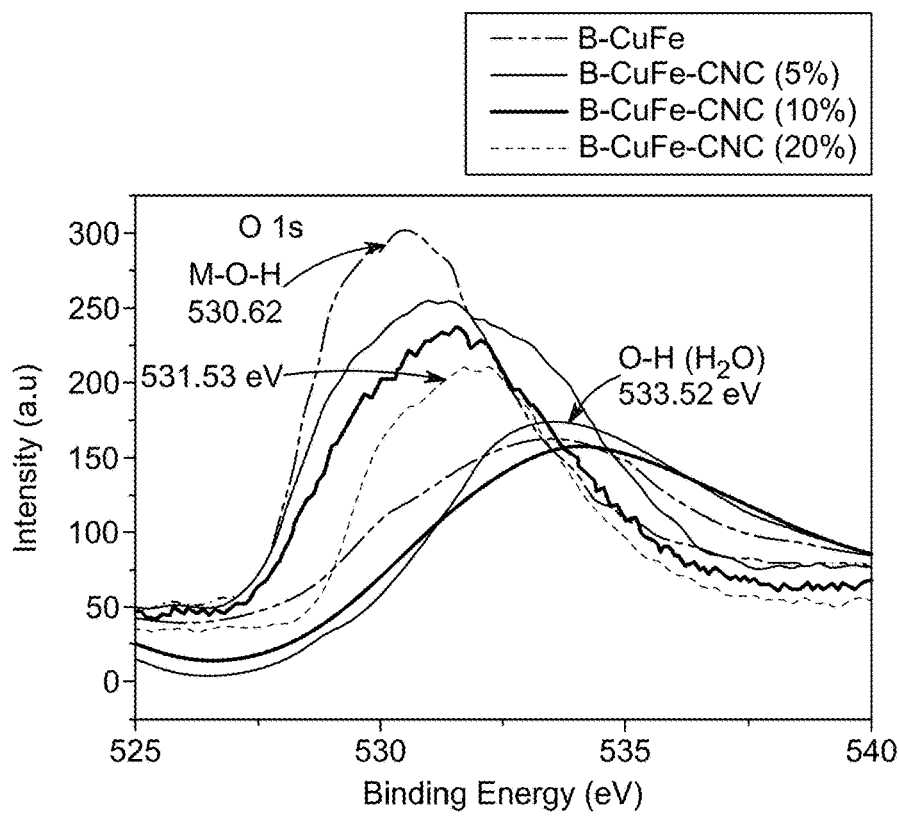
FIG. 7B depicts O 1s XPS spectrum of B—CuFe and various B—CuFe-CNC biocomposites, according to certain embodiments.
Figure 7C:
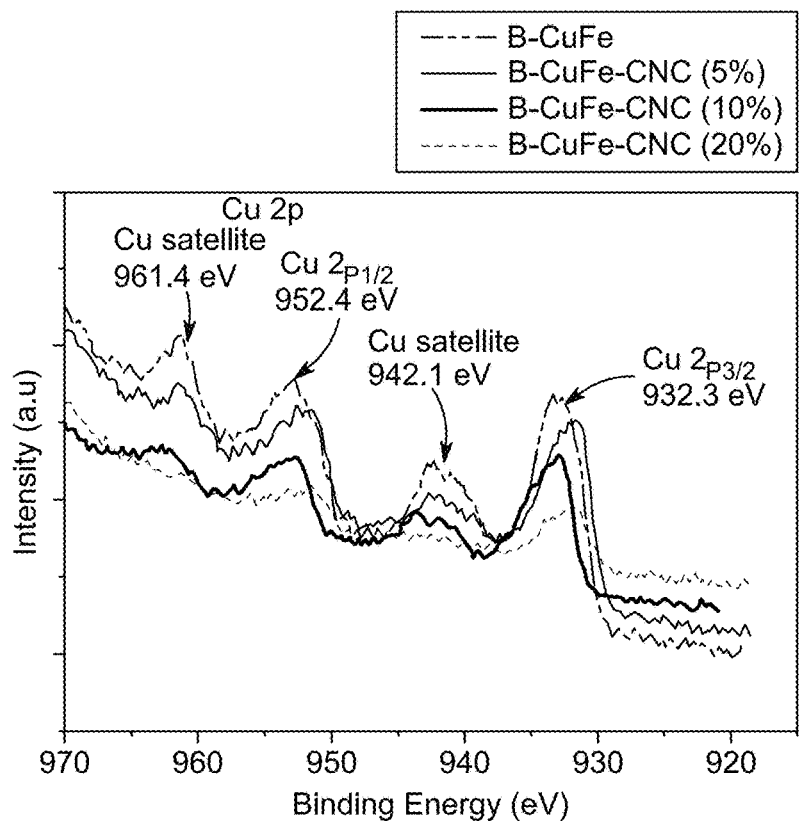
FIG. 7C depicts Cu 2p XPS spectrum of B—CuFe and various B—CuFe-CNC biocomposites, according to certain embodiments.
Figure 7D:
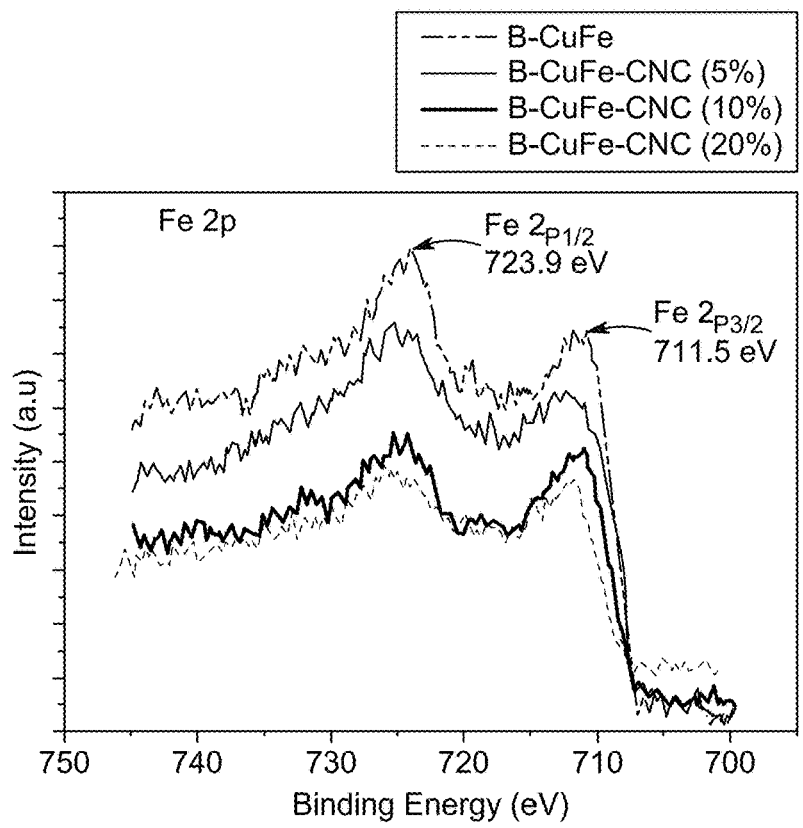
FIG. 7D depicts Fe 2p XPS spectrum of B—CuFe and various B—CuFe-CNC biocomposites, according to certain embodiments.

TGA analysis was performed to evaluate the changes in the thermal behavior of the B—CuFe-CNC biocomposites after incorporating the CNC. The decrease in weight loss of the biocomposites with the increase in temperature (20-800° C.) is shown in FIG. 5C. It was observed all the B—CuFe-CNC biocomposites exhibited a weight loss (5-8%) at temperature (20-800° C.) is shown in FIG. 5C. It was observed all the B—CuFe-CNC biocomposites exhibited a weight loss (5-8%) at temperature <120° C. (stage A), which is due to the escape of water molecules that were in the interlayer and physically absorbed. The percentage of weight loss at the temperature range of 120-500° C. (stage B) is associated with the pyrolysis of CNC catalyzed by sulfate groups and the release of $NO_3^{2-}$ from LDH layers. For the B—CuFe-CNC (5 and 10%), about 8-9% weight loss was observed in stage B. The B—CuFe-CNC biocomposites with higher CNC loading (15-25%) showed a 14-18% weight loss in stage B. However, stage C corresponded to the complete pyrolysis of the CNC, dihydroxylation, and production of oxides of Cu and Fe metal cations. A higher weight loss (around 11-13%) was observed for the The results are consistent with SEM results which indicate the formation of the CNC aggregates in the B—CuFe-CNC (25%) biocomposite. The results demonstrate that incorporating a low percentage of CNC (5-10%) in the B—CuFe-CNC biocomposite leads to an effective decoration within the B—CuFe layers without damaging the surface characteristics and crystallinity of the CuFe LDH. The pore size distribution of the biocomposites was measured by BJH (Barrett, Joyner, and Halenda) method (Table 3, FIG. 6B). The incorporation of the CNC into the B—CuFe-CNC biocomposites enhanced the pore radius distribution compared to the pristine B—CuFe. The maximum pore diameter of the B—CuFe-CNC biocomposites was in the range of 70-100 Å, whereas 45-65 Å for the B—CuFe composites.

The XPS results of the biocomposites are shown in FIGS. 7A-7D. In the C1s spectrum of the B—CuFe composite, the presence of two compounds, C—H and C—C, correspond to binding energy at 283.89 and 285.73 electron volts (eV), respectively. Incorporation of the CNC (5-25%) onto the B—CuFe composite demonstrated the presence of oxygen functional groups (C=O) at 286.95 and (O—C=O) at 289.27 eV. In addition, the B—CuFe-CNC (10%) indicated high peak intensity of (—O—C=O, C—C, and C—H) groups which confirmed the existence of excess surface functionalities on the surface of the biocomposite. The O1s spectrum confirmed the presence of O—H bonded with metal cations (M=Cu and Fe) at 530.62-531.53 eV and —OH bonded with water molecules at 533.52 eV on the B—CuFe and B—CuFe-CNC biocomposite surfaces, respectively.

As seen, the M-O—H groups in the B—CuFe shifted to high binding energy and lower intensity with the addition of the CNC. This is due to the interaction of the CNC molecules with metal hydroxides. An XPS spectrum of Cu 2p indicated the presence of main characteristic peaks at (932.3 and 952.4 eV) binding energy. These peaks correspond to Cu $2p_{3/2}$ and Cu $2p_{1/2}$. Main peaks at 942.1 and 961.4 eV imply the existence of Cu(II) in biocomposites.

Similarly, exist two broad satellite peaks at 711.5 eV and 723.9 eV are associated with Fe $2p_{3/2}$ and Fe $2p_{1/2}$ of Fe(III) LDH structure. As seen in Cu 2p and Fe 2p spectrum, the position of characteristics peaks of $Cu^{2+}$ and $Fe^{3+}$ showed a negative shift of 0.6-0.8 eV with the presence of the CNC in the B—CuFe composite. Additionally, these characteristic peaks were reduced to the low intensity at higher CNC (10-20 wt. %) loading biocomposite. These changes indicate the formation of metal complexation with CNC surface functional groups.

mg/L, pH 2.5, and temperature of 25° C. An increase in CNC percentage to 25% in the B—CuFe-CNC biocomposite reduces the EBT dye removal. This is due to the ineffective distribution of the CNC particles with the composite matrix causing agglomeration and stacking of the CNC particles and the resultant low surface area, as evident from FIGS. 3A-3D and Table 3, respectively. Moreover, the presence of a large amount of the CNC (15-25%) in the B—CuFe composite is thought to increase the surface charge, which inhibits the protonation due to the enriched hydroxyl anions and compete with EBT anions reducing interaction with surface functionality of the B—CuFe-CNC biocomposite.

A three-level Box Behnken factorial design (BBD) was applied. The adsorption process response, which includes the removal of EBT (%) and adsorption capacity (mg/g), was investigated with four main adsorption parameters, as shown in Table 2. The experimental adsorption results according to BBD optimization are presented in Table 4.

TABLE 4

Results of experimental design and RSM analysis for adsorption of EBT onto B—CuFe—CNC.

|  | Adsorption conditions | | | | | | Model | |
| --- | --- | --- | --- | --- | --- | --- | --- | --- |
|  |  |  |  |  |  |  | Adsorption | Adsorption |
| Test# | A | B | C | D | Removal (%) ($Y_1$) | capacity (mg/g) ($Y_2$) | Removal (%) ($Y_1$) | capacity (mg/g) ($Y_2$) |
| 1 | 5 | 200 | 10 | 45 | 48.13 | 173.28 | 47.94 | 170.54 |
|  | 5 | 40 | 15 | 35 | 41.78 | 150.42 | 42.64 | 154.51 |
| 2 | 5 | 120 | 10 | 35 | 43.4 | 173.6 | 41.98 | 174.01 |
| 3 | 2 | 40 | 10 | 35 | 45.27 | 162.96 | 47.94 | 170.54 |
| 4 | 5 | 200 | 15 | 35 | 48.05 | 172.98 | 47.94 | 170.54 |
| 5 | 5 | 40 | 10 | 45 | 65.88 | 132.9 | 66.29 | 137.94 |
| 6 | 8 | 120 | 10 | 25 | 70.91 | 425.43 | 71.15 | 426.68 |
| 7 | 5 | 120 | 15 | 25 | 55.66 | 134.04 | 56.41 | 138.14 |
| 8 | 5 | 120 | 5 | 25 | 92.72 | 74.18 | 94.39 | 72.89 |
| 9 | 5 | 120 | 10 | 35 | 65.16 | 210.55 | 62.62 | 220.31 |
| 10 | 2 | 120 | 15 | 35 | 52.11 | 125.48 | 51.93 | 123.22 |
| 11 | 8 | 120 | 15 | 35 | 67.92 | 440.61 | 71.87 | 434.76 |
| 12 | 8 | 40 | 10 | 35 | 45.65 | 262.5 | 45.89 | 256.65 |
| 13 | 5 | 120 | 10 | 35 | 62.55 | 149.92 | 63.8 | 147.86 |
| 14 | 5 | 120 | 15 | 45 | 94.22 | 335 | 93.03 | 335.43 |
| 15 | 5 | 120 | 10 | 35 | 39.77 | 350.55 | 41.78 | 343.25 |
| 16 | 5 | 200 | 5 | 35 | 93.35 | 95.55 | 92.22 | 81.96 |
| 17 | 5 | 120 | 10 | 35 | 41.55 | 299.16 | 41.46 | 291.08 |
| 18 | 2 | 200 | 10 | 35 | 46.5 | 165.22 | 47.94 | 170.54 |
| 19 |  |  |  |  |  |  |  |  |
| 20 | 8 | 120 | 5 | 35 | 48.74 | 175.22 | 47.94 | 170.54 |

*where 'A' denotes pH, 'B' denotes concentration, 'C' denotes dosage, and 'D' denotes temperature.

Example 9: EBT Adsorption by the Biocomposites

Figure 8A:
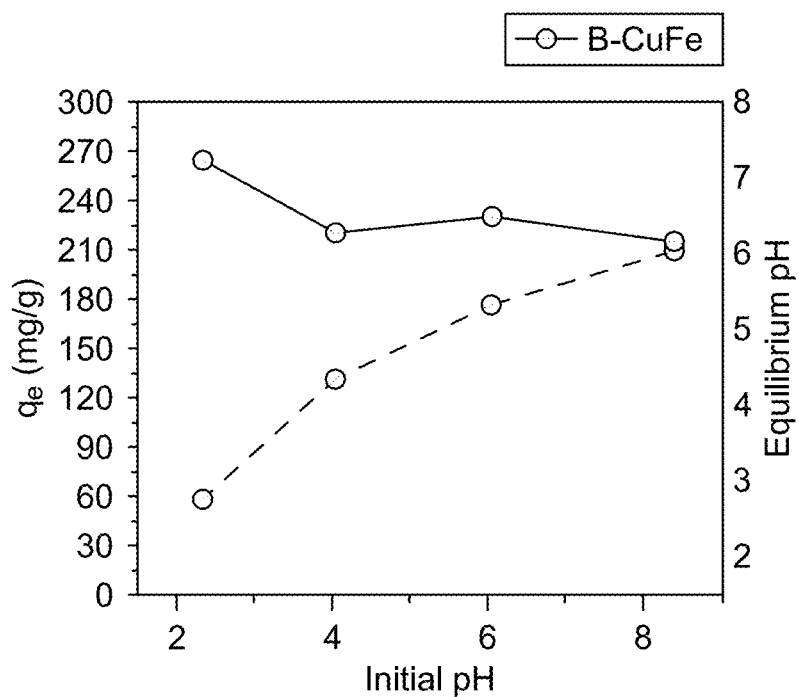
FIG. 8A is a plot depicting an effect of pH on adsorption capacity of Eriochrome Black T (EBT) with B—CuFe, according to certain embodiments.
Figure 8B:
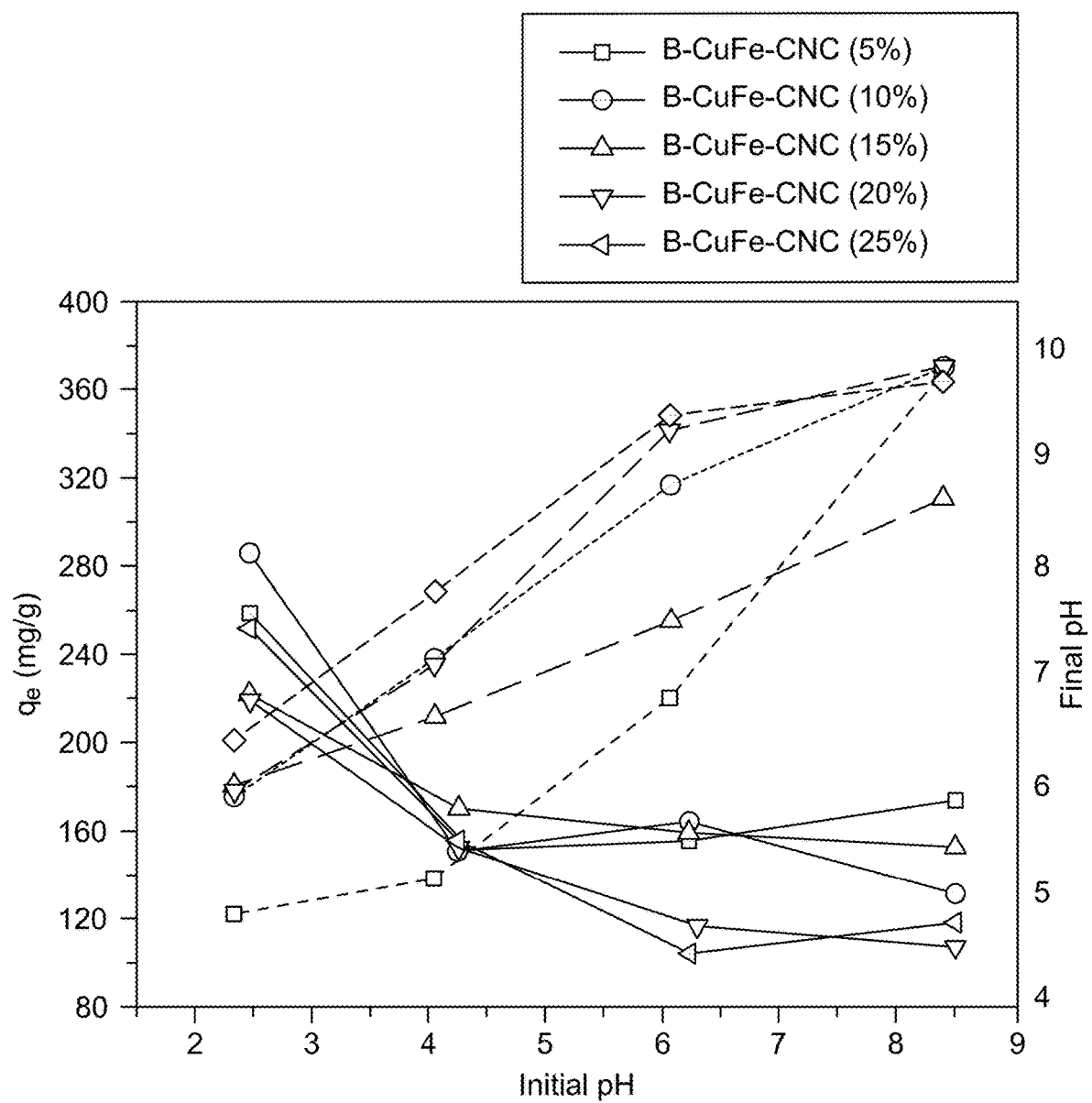
FIG. 8B is a plot depicting an effect of pH on the adsorption capacities of the EBT with various B—CuFe-CNC biocomposites, according to certain embodiments.

The preliminary experiments at varied pH ranges were conducted to select the B—CuFe-CNC biocomposite with better physicochemical characteristics and improved affinity toward the anionic EBT dye. Results of the dye adsorption onto the B—CuFe LDH and B—CuFe-CNC biocomposites at various initial pH are shown in FIGS. 8A-8B. The incorporation of low loadings of the CNC (i.e., 5-10%) resulted in enhanced adsorption of the EBT. The maximum dye sorption capacity of 284.22 mg/g was obtained by the B—CuFe-CNC (10%) at an initial EBT concentration of 100

The models' equations are indicated in Equations (4)-(5) where $Y_1$ is EBT removal (%), and $Y_2$ is biocomposite adsorption capacity in mg/g.

Removal (%) = (4)

$$Y_1 = 47.94 - 15.21 \times A - 18.39 \times B + 11.17 \times C + 9.99 \times D -$$
$$1.21 \times AB - 7.82 \times BC - 6.83 \times BD - 2.81 \times CD +$$
$$19.90 \times A^2 + 9.08 \times B^2 + 3.79 \times AB^2.$$

Adsorption capacity $\left(\frac{mg}{g}\right)$ = (5)

$$Y_2 = 174.88 - 56.98 \times A + 105.04 \times B - 87.11 \times C +$$

-continued $$34.76 \times D - 28.67 \times AB + 15.49 \times AC - 54.48 \times BC +$$
$$25.60 \times BD - 6.76 \times CD + 65.12 \times A^2 + 38.10 \times C^2.$$

The model results demonstrated that the predicted values for the % removal were well fitted to the predicted model equation, indicating almost similar values to the actual results. The evaluation of the quadratic regression model by analysis of variance (ANOVA) is listed in Table 5.

TABLE 5

Variance analysis of EBT dye adsorption using biocomposite.

| | $Y_1$ | | $Y_2$ | |
|---|---|---|---|---|
| | F-Value | P-value | F-Value | P-value |
| Model | 165.28 | <0.0001 | 405.21 | <0.0001 |
| A | 424.08 | <0.0001 | 657.8 | <0.0001 |
| B | 737.65 | <0.0001 | 2235.37 | <0.0001 |
| C | 272.23 | <0.0001 | 1537.09 | <0.0001 |
| D | 217.6 | <0.0001 | 244.72 | <0.0001 |
| AB | 1.06 | 0.319 | 55.52 | <0.0001 |
| AC | 2 | 0.1778 | 16.21 | 0.0011 |
| AD | 0.7852 | 0.3895 | 0.6626 | 0.4284 |
| BC | 44.47 | <0.0001 | 200.43 | <0.0001 |
| BD | 33.91 | <0.0001 | 44.26 | <0.0001 |
| CD | 5.73 | 0.0302 | 48.35 | <0.0001 |
| $A^2$ | 499.05 | <0.0001 | 505.9 | <0.0001 |
| $B^2$ | 105.24 | <0.0001 | 0.0014 | 0.9707 |
| $C^2$ | 0.0004 | 0.9843 | 176.83 | <0.0001 |
| $D^2$ | 0.9832 | 0.3371 | 7.36 | 0.016 |
| $A_2B$ | 12.09 | 0.0037 | — | — |
| Lack of Fit | 2.26 | 0.1916 | 2.9 | 0.1254 |

According to the results of variance analysis, the p-value of <0.0001 for both responses (% R and qe) specifies that the applied models are statistically significant and showed a better correlation between responses and the independent variables. The values with p<0.05 and p>0.1 demonstrate that the term is a significant and insignificant influence on adsorption parameters. Thus, in the present disclosure, only significant terms are considered, including single, binary, and quadratic interactions on both model responses. As is seen from the ANOVA results (Table 5), F-value for $Y_1$ and $Y_2$ was 165.28 and 405.21, respectively. Moreover, the significant parameters (p <0.05) consist of adsorption parameters (A to D), binary parameters interaction including CD, BD, and BC, and quadratic terms $A^2$, and $B^2$, for response $Y_1$. Besides linear adsorption terms (A to D), four binary terms AB, AC, BC, BD, CD, and two quadratic interactions $A^2$ and $C^2$ indicated a significant impact on $Y_2$ (Table 5).

Figure 8C:
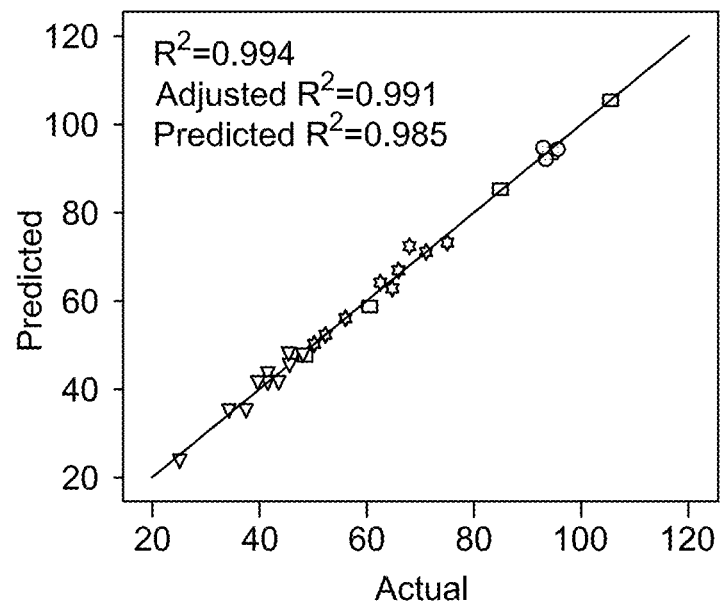
FIG. 8C is a plot depicting actual vs. predicted values of the EBT removal with the B—CuFe-CNC biocomposite, according to certain embodiments.
Figure 8D:
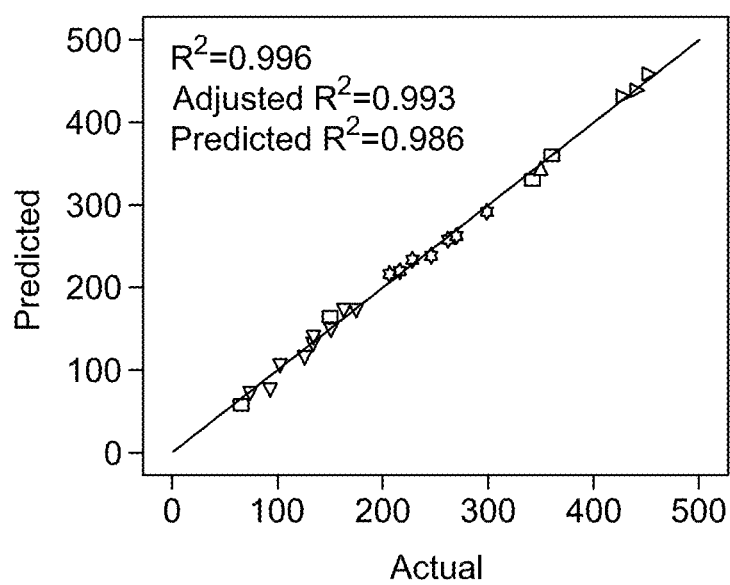
FIG. 8D is a plot depicting actual vs. predicted values of the EBT removal for the B—CuFe-CNC biocomposite, according to certain embodiments.

To further verify the proposed BBD-RSM models for dye adsorption by the B—CuFe-CNC biocomposite was supported on the values of ($R^2$) for adsorption responses ($Y_1$ and $Y_2$), which were 0.994 and 0.996, respectively. These $R^2$ values (0.994 and 0.996, experimental) for responses ($Y_1$ and $Y_2$) are nearly similar to the $R^2$ (0.985 and 0.986, predicted) and $R^2$ values (0.991 and 0.993, adjusted) (FIGS. 8C-8D). The developed quadratic models using the RSM technique can appropriately explain the main interactions of process variables with the model responses. For model responses $Y_1$ and $Y_2$, the adjusted $R^2$ values of 0.991 and 0.993 imply that the developed BBD-RSM models described the adsorption system of the EBT dye by the biocomposite with 99.1% and 99.3% accuracy.

The influence of adsorption process parameters, including dye concentration, initial solution pH, biocomposite dosage, and temperature, are shown in FIG. 9A-FIG. 9F. As evident from FIG. 9A, at acidic pH (2-4), a minimal reduction of about 15% in removing the EBT was observed when the initial EBT dye concentration was raised from 40 to 200 mg/L at the biocomposite dosage of 10 mg at 35° C. The effect of the initial EBT dye concentration on the EBT % removal by the B—CuFe-CNC biocomposite was found to be higher at solution pH values in the range of 5-8. For instance, at the initial solution pH value of 5, the removal (%) of EBT dye linearly decreased from around 41 to 19%, with an increase in dye concentration from 40 to 200 mg/L. The pH effect results are well supported based on changes in the surface chemistry of the biocomposite and EBT dye molecules at varied solution pH. To support this, the point of zero charges of biocomposite was 7.81, which was determined through the pH drift method. Thus, at pH<7.81, the surface of the B—CuFe-CNC is protonated and consists mainly of ($OH_2^+$) groups which can promote electrostatic interactions with the EBT anions ($—SO_3^-$). In addition, at a low pH (2-4), the excess ($OH_2^+$) ions on the surface of the B—CuFe-CNC biocomposite strongly attract the EBT anions from the aqueous solution. An increase in pH values results in forming of excess OH-ions, which pose a competitive effect on the EBT anionic species. This led to the low removal of the EBT molecules from water at a high solution pH (6-8).

Figure 9A:
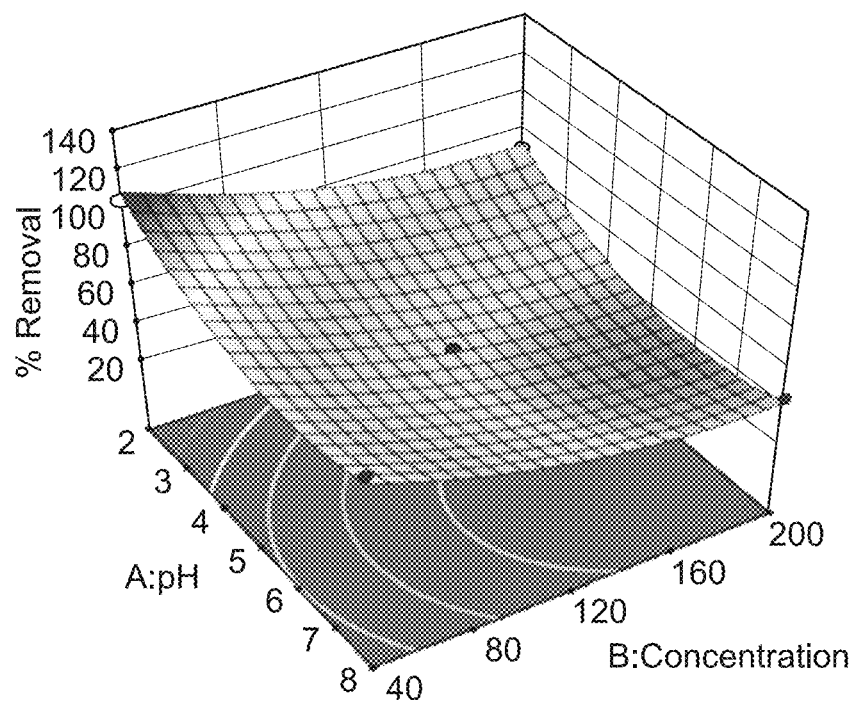
FIGS. 9A-9F depict effect of adsorption process parameters, including dye concentration, initial solution pH, dosage, and temperature on the % EBT removal and adsorption capacity by the B—CuFe-CNC biocomposite, according to certain embodiments.
Figure 9B:
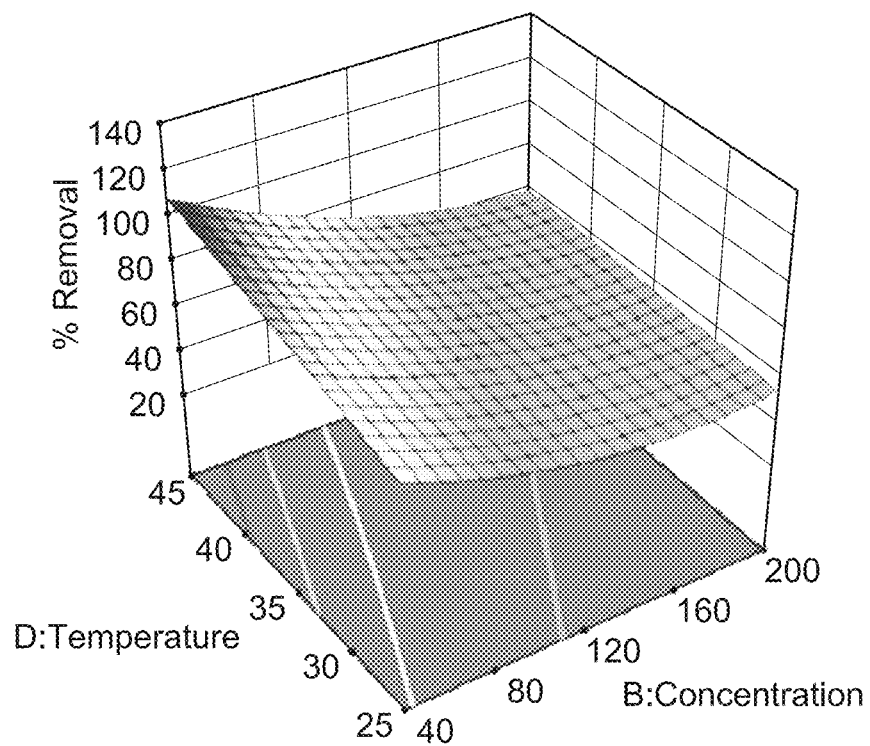
Figure 9C:
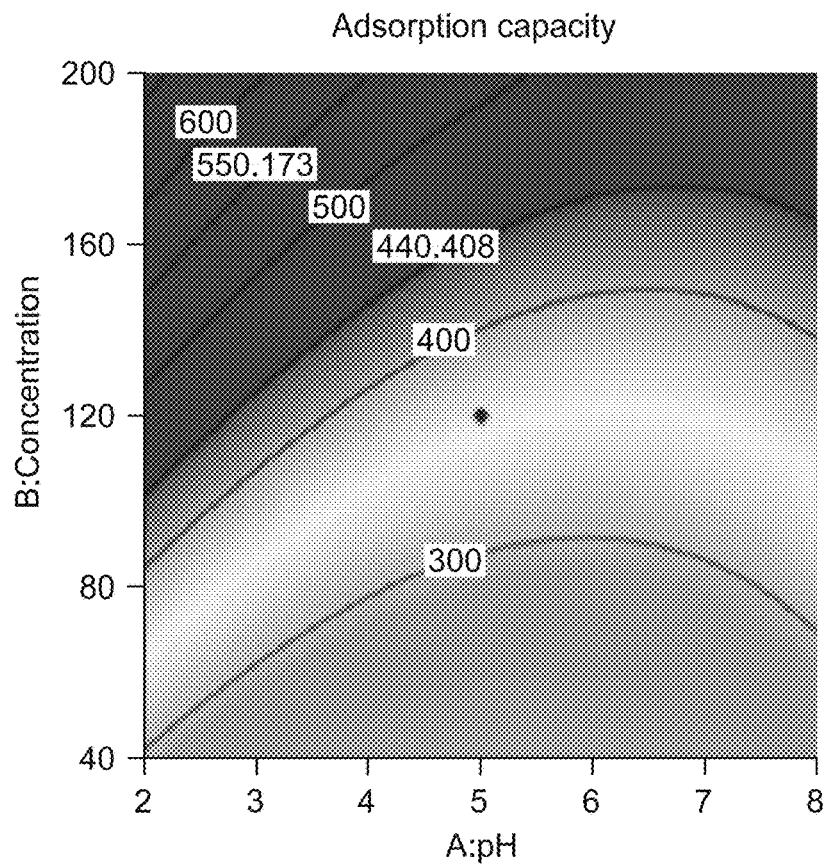

Similarly, an increase in temperature exhibited enhanced uptake of the EBT molecules onto the biocomposite (FIG. 9B). The % removal of the EBT dye jumped from (40-45) % to (70-81) % (approximately 85-90% increase) when the temperature raised from 25 to 45° C. at an initial solution pH value of 5, a biocomposite amount of 10 mg and an initial EBT dye concentration of (120-40) mg/L. However, at higher concentration levels >120 mg/L, the increase in temperature indicated negligible variation in removal (%) of dye. Enhancement in the uptake of dye at higher adsorption temperatures specify the endothermic nature, FIG. 9C shows that at pH in the range of 2-8, the increase in the EBT concentration from 40 to 200 mg/L adsorption increase the adsorption capacity of the biocomposite from approximately (240-200) mg/g to nearly (615-550) mg/g. The enhancement in adsorption potential of the biocomposite at high concentration is attributed to the excess EBT anionic species, which increases the mass transfer and completely saturate external/internal active binding sites on the biocomposite surface.

Figure 9D:
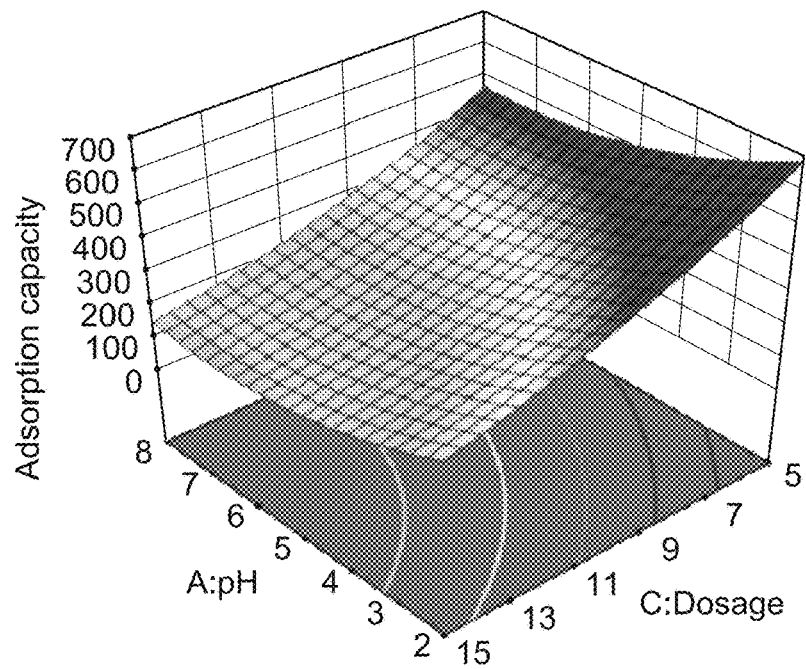
Figure 9E:
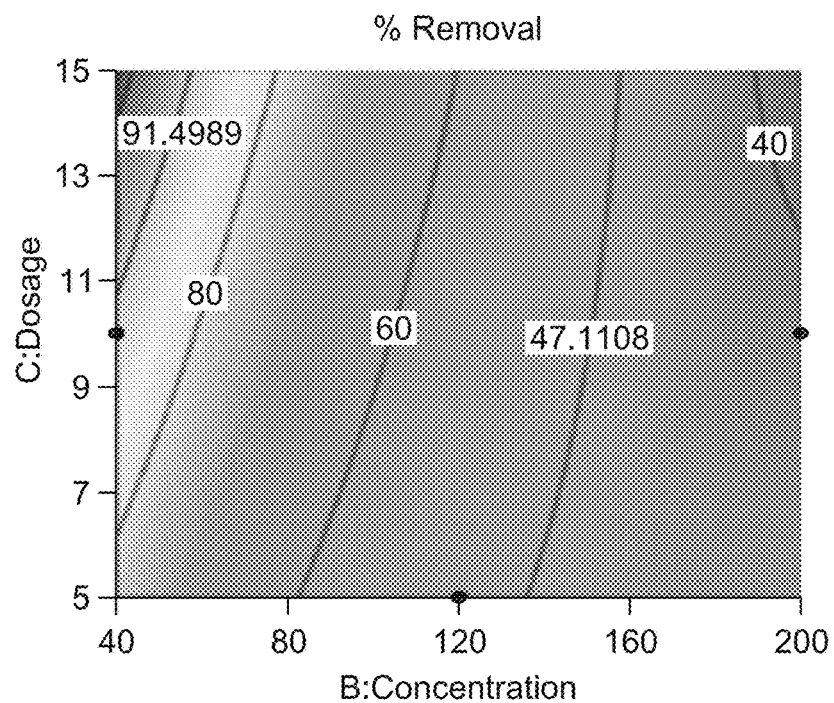
Figure 9F:
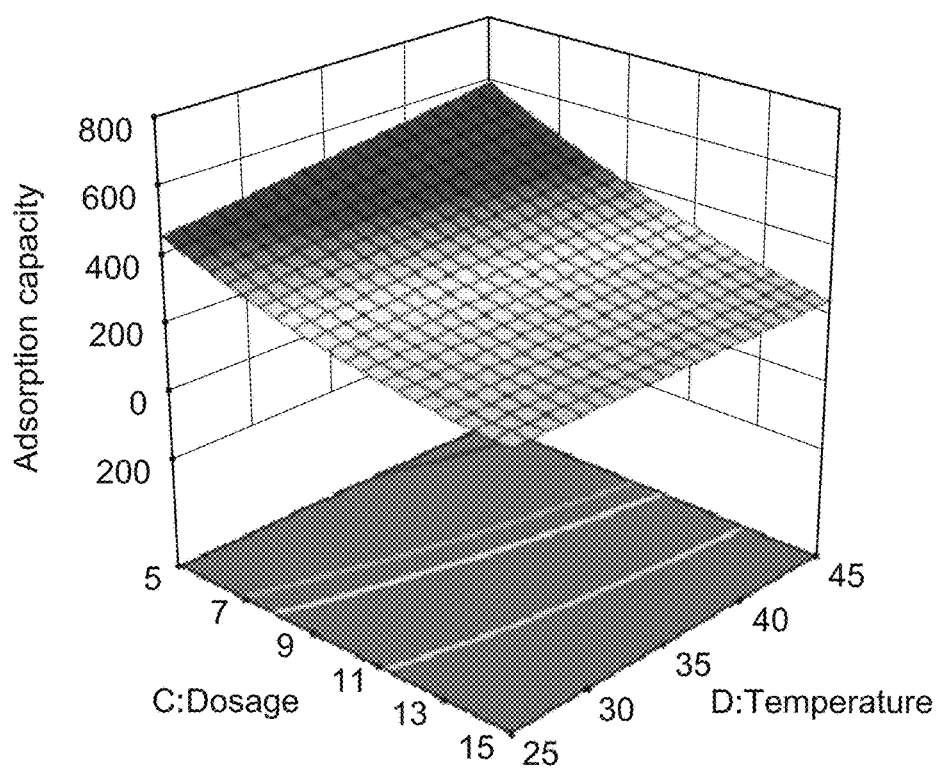

FIG. 9D shows at a low dosage (5-10 mg) and in the acidic pH range (2-5), the dye adsorption performance of biocomposite is higher (i.e., 600-700 mg/g) at 200 mg/L of the dye concentration and 45° C. temperature. The higher EBT uptake capacity of the B—CuFe-CNC biocomposite is mainly due to the existence of more adsorption sites and enhanced crystal size, and improved hydrophilicity of the biocomposite due to the incorporation of the CNC particles. The improved physicochemical characteristics of the biocomposite provided favorable platform for a better and more effective interface between the biocomposite functionalities and the EBT anionic molecules. The increasing biocomposite dosage from 10 to 15 mg showed a linear reduction in dye adsorption (FIG. 9E). This is attributed to the availability of enriched binding sites which are not consumed or saturated by the EBT molecules that cause a decrease in adsorption capacity. Moreover, as seen in FIG. 9F, there is an improvement in adsorption capacity at elevated adsorption temperatures. For instance, at pH 3 and dye concentration of 200 mg/L, and a biocomposite dosage of 5 mg, the adsorption capacity increased from 425 mg/g to 600 mg/g with the rise in adsorption temperature from 25 to 45° C., respectively. This confirms the endothermic nature of the EBT-B—CuFe-CNC biocomposite adsorption process. However, at a higher dosage of the B—CuFe-CNC biocomposite (10 mg), the adsorption potential of B—CuFe-CNCs biocomposite was found independent of temperatures.

As observed in the RSM modeling, dependent variables (pH, dosage, temperature, and concentration) impacted the % removal and adsorption capacity of the B—CuFe-CNC biocomposite. Therefore, the adsorption process was performed to determine the appropriate EBT adsorption variables for achieving the maximum EBT adsorption by the B—CuFe-CNC biocomposite. In this regard, the design of the expert software desirability function was employed considering four target goals, as summarized in Table 6.

adsorption equilibrium is achieved by the B—CuFe-CNC (10%) biocomposite at a lower concentration (i.e., 40 mg/L). The equilibrium took longer as the dye concentration increased (120 and 200 mg/L). The equilibrium time was achieved within 30 minutes for a dye concentration of 40 mg/L, while it took 45 minutes for both 120 and 200 mg/L of the dye concentration. At high concentrations, the driving force of adsorption decreases, and the adsorption process becomes slower. Despite the difference in initial dye concentrations, the adsorption process was faster initially for all concentrations, which is the presence of excess active adsorption sites that are easily accessible to the dye molecules.

TABLE 6

Target scenarios for EBT dye adsorption onto B—CuFe—CNC biocomposite.

| Targets | Scenario 1 | Result 1 | Scenario 2 | Result 2 | Scenario 3 | Result 3 | Scenario 4 | Result 4 |
|---|---|---|---|---|---|---|---|---|
| A: pH | is in range | 2.43 | is in range | 3.97 | Minimize | 3.39 | maximize | 7.99 |
| B: Initial concentration (mg/L) | is in range | 89.76 | is in range | 180.61 | Maximize | 199.91 | maximize | 199.31 |
| C: Dosage (mg) | is in range | 14.62 | is in range | 5.171 | is in range | 5 | is in range | 5 |
| D: Temperature (° C.) | is in range | 44.27 | is in range | 44.5 | is in range | 44.44 | maximize | 45 |
| Removal (%) | maximize | 101.23 | in the range | 50.21 | Minimize | 53.38 | is in range | 48.87 |
| Adsorption capacity (mg/g) | is in range | 185.12 | maximize | 533.62 | Maximize | 618.64 | maximize | 513.76 |
| Desirability | — | 1 | — | 1 |  | 0.84 |  | 0.999 |

The main target goal is to achieve the highest % removal of the EBT and adsorption capacity of the B—CuFe-CNC biocomposite at varied adsorption conditions. The two scenarios' results indicated the highest desirability of 1 showed that the highest EBT % was obtained at pH 2.43, concentration 89.76 mg/L, dosage 14.62 mg, and temperature 44.27° C. In addition, the highest adsorption capacity (qe) of the B—CuFe-CNC biocomposite of 618.64 mg/g was achieved a pH 3.39, a concentration of 199.91 mg/L, a dosage of 5 mg, at a temperature of 44.44° C.

Figure 10B:
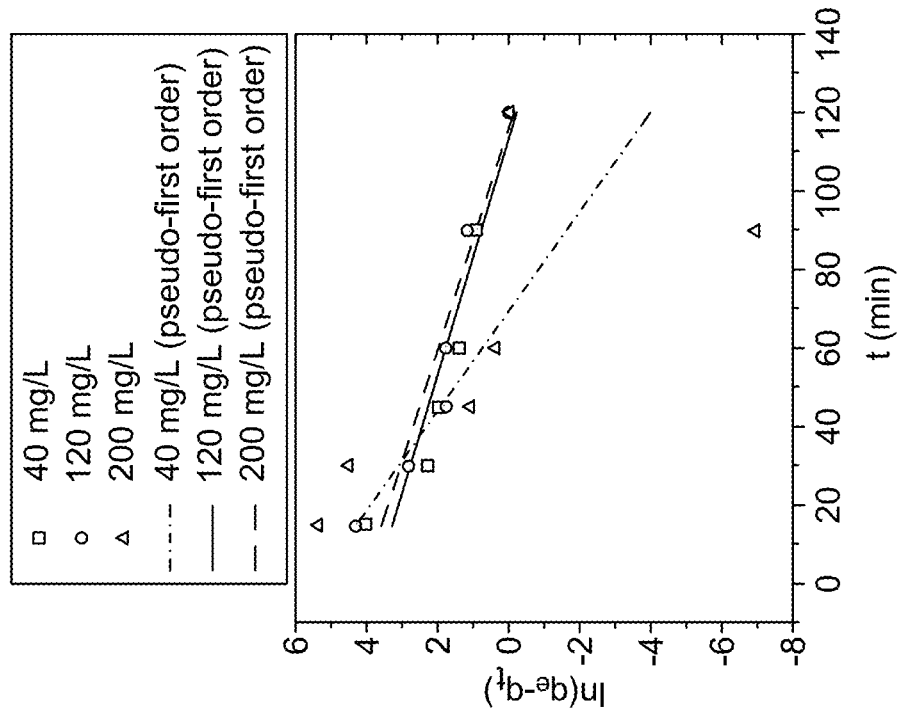
FIG. 10B is a plot depicting a pseudo-first-order reaction on the EBT adsorption by the B—CuFe-CNC biocomposite, according to certain embodiments.
Figure 10A:
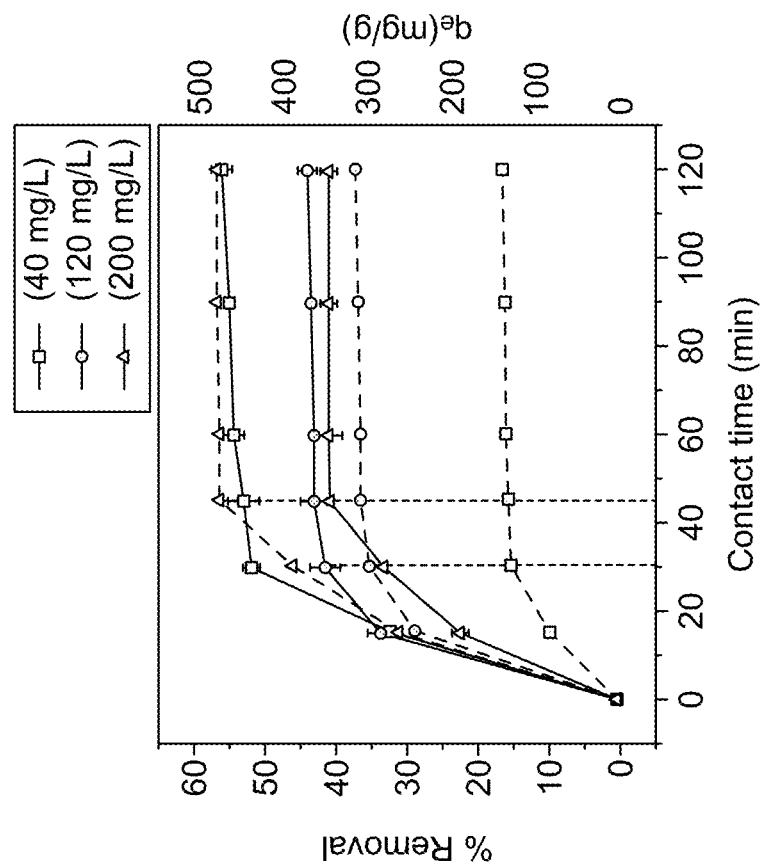
FIG. 10A is a plot depicting effect of contact time on the EBT adsorption by the B—CuFe-CNC biocomposite, according to certain embodiments.
Figure 10D:
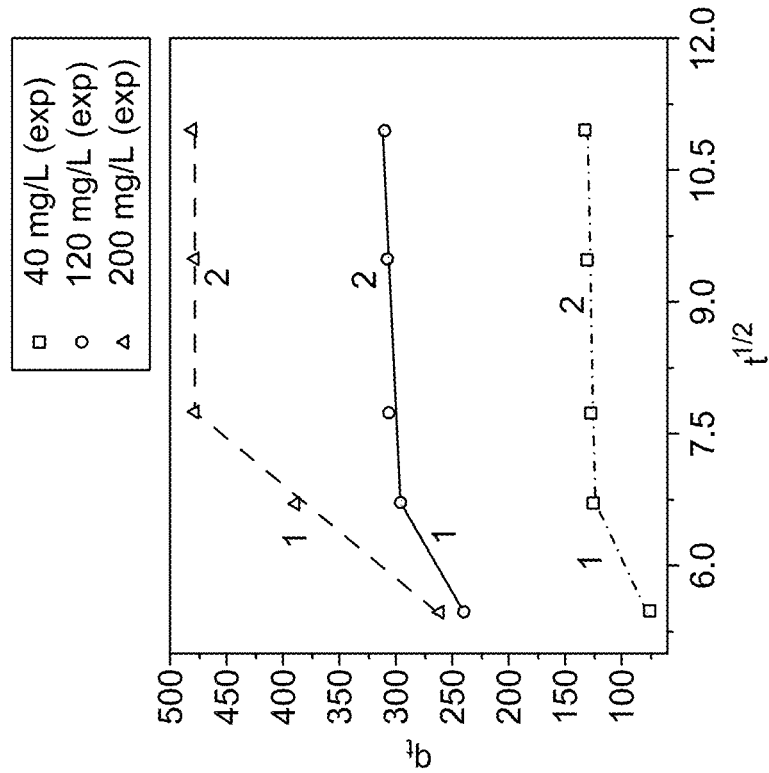
FIG. 10D is a plot depicting an intraparticle diffusion model for the EBT adsorption by the B—CuFe-CNC biocomposite, according to certain embodiments.
Figure 10C:
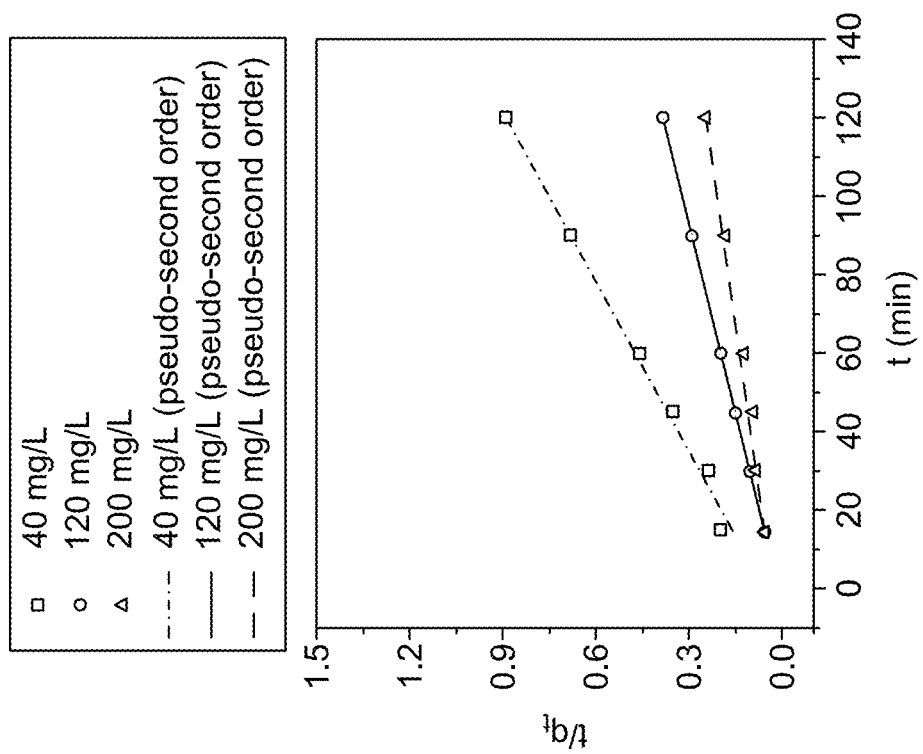
FIG. 10C is a plot depicting a pseudo-second-order reaction on the EBT adsorption by the B—CuFe-CNC biocomposite, according to certain embodiments.

Kinetics studies for the adsorption of pollutants onto an adsorbent gives an idea of the rate of adsorption and equilibrium time. FIG. 10A shows that the fastest EBT The fast dye adsorption by the synthesized biocomposite is due to its better surface characteristics, surface functionalities and improved hydrophilicity that promotes a better interaction between the EBT anionic species and the B—CuFe-CNC biocomposite surface. The experimental data were also checked by applying four kinetic models, i.e., pseudo-first order, pseudo-second order, intraparticle diffusion, and film diffusion models (FIG. 10B-FIG. 10D). The diffusion were employed to confirm the existence or absence of dye molecules' diffusion through an external surface or an internal pore of the adsorbent. The kinetic parameters obtained from these four kinetics models are listed in Table 7.

TABLE 7

Parameters of linear kinetic models for the adsorption of EBT onto B—CuFe—CNC biocomposite.

| | | Pseudo-first order | | | | Pseudo-second order | | | |
|---|---|---|---|---|---|---|---|---|---|
| Co | $q_{e\,(exp)}$ | $q_e$ | $k_1$ | $R^2$ | RMSE | $q_e$ | $k_2 \times 10^{-1}$ | $R^2$ | RMSE |
| 40 | 134.7 | 43.42 | 0.076 | 0.88 | 0.371 | 144.92 | 0.008 | 0.994 | 0.023 |
| 120 | 312.8 | 60.46 | 0.081 | 0.893 | 0.85 | 322.58 | 0.008 | 0.999 | 0.003 |
| 200 | 479.04 | 237.61 | 0.181 | 0.497 | 0.866 | 526.31 | 0.001 | 0.99 | 0.008 |

| | | Intra particle diffusion | | | | Film diffusion model | |
|---|---|---|---|---|---|---|---|
| | $q_{e\,(exp)}$ | C | $k_d$ | $R^2$ | RMSE | $R^2$ | RMSE |
| 40 | 134.7 | 0.036 | 0.004 | 0.612 | 32.77 | 0.888 | 0.289 |
| 120 | 312.8 | 0.023 | 0.004 | 0.489 | 86.98 | 0.9 | 0.248 |
| 200 | 479.04 | 0.014 | 0.004 | 0.697 | 104.5 | 0.901 | 0.434 |

The correlation coefficient ($R^2$) of pseudo-second order and film diffusion models were higher than the other two models, i.e., pseudo-first order and intraparticle diffusion models (Table 7). This indicated that the EBT molecules were adsorbed onto the B—CuFe-CNC (10%) biocomposite surface via hydrogen bonding and chemical complexation, and both chemisorption and film diffusion are the rate-controlling steps. The surface functionalities, hydrophilicity, and large surface area of biocomposite contribute to the enhanced interactions with EBT anionic molecules.

Figure 11A:
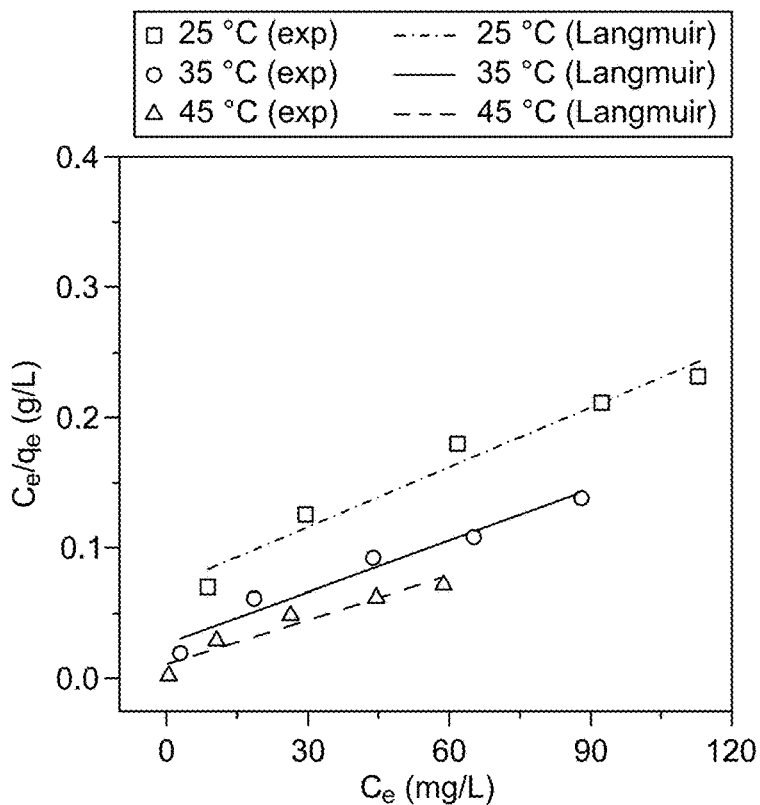
FIG. 11A depicts a linear Langmuir isotherm plot for the removal of the EBT by the B—CuFe-CNC biocomposite, according to certain embodiments.
Figure 11B:
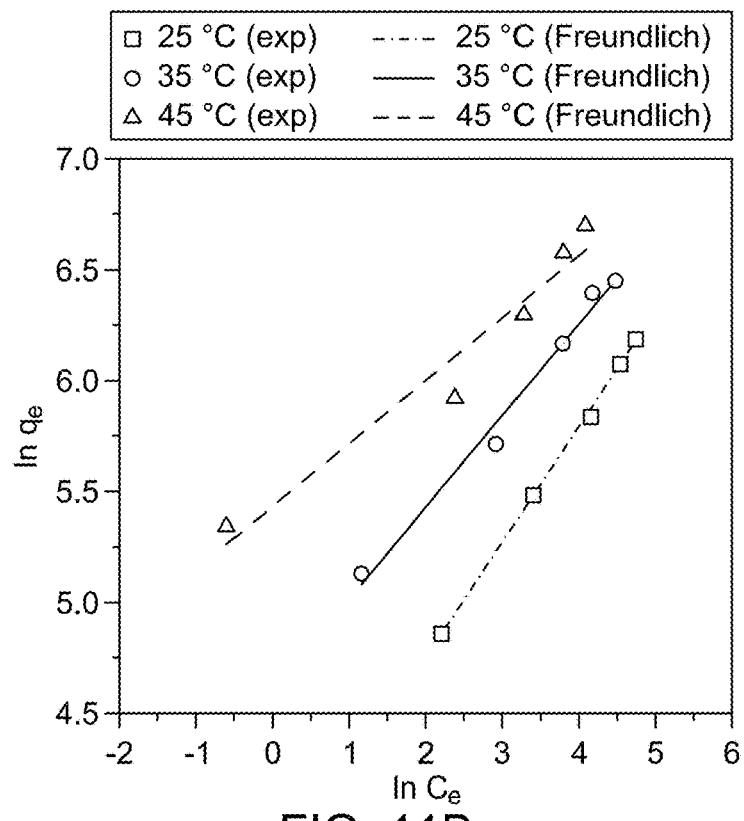
FIG. 11B depicts a Freundlich isotherm plot for the removal of the EBT by the B—CuFe-CNC biocomposite, according to certain embodiments.
Figure 11C:
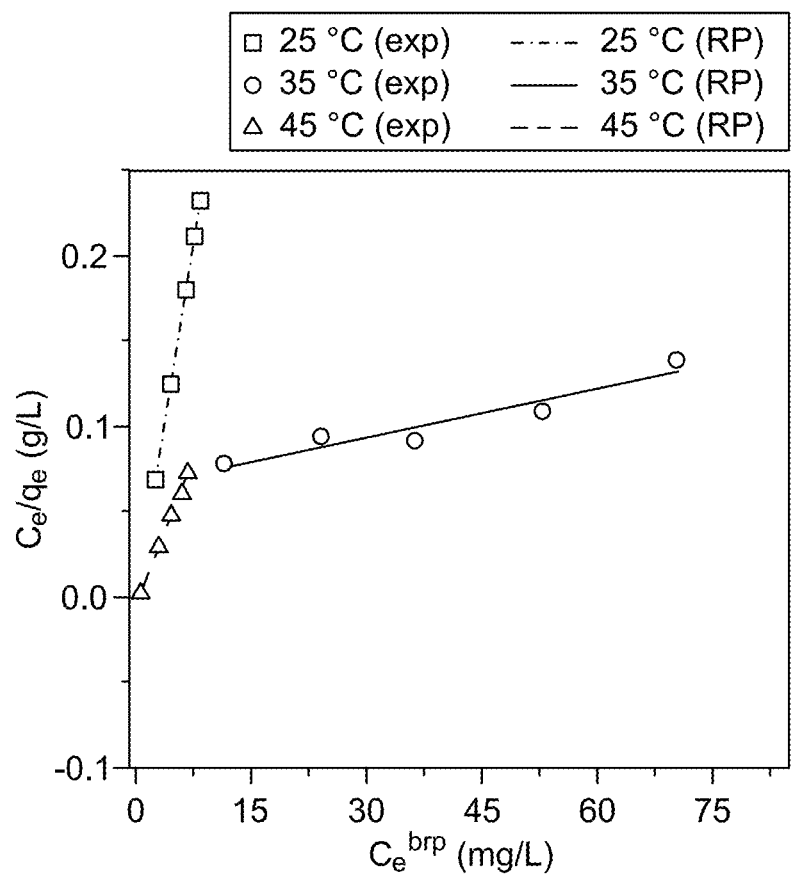
FIG. 11C depicts a Redlich Peterson isotherm plot for the removal of the EBT by the B—CuFe-CNC biocomposite, according to certain embodiments.

The adsorption behavior of the EBT molecules (monolayer or multilayer) on the biocomposite surfaces was assessed by applying equilibrium experimental data to four widely used isotherm models (Table 7). Linear plots of respective isotherm models are depicted in FIGS. 11A-11C, while the mathematical equations and parameters are listed in Table 8.

TABLE 8

Adsorption parameters of isotherm models for the adsorption of EBT on B—CuFe—CNC (10%) biocomposite.

| T | Langmuir $\frac{C_e}{q_e} = \frac{q_m}{k_l} + \frac{C_e}{q_m}$ | | | | Freundlich $\ln q_e = \ln K_F + \frac{1}{n}\ln C_e$ | | | |
|---|---|---|---|---|---|---|---|---|
| (° C.) | $q_{max(mg/g)}$ | $K_L$ | $R^2$ | RMSE | $K_F$ | 1/n | $R^2$ | RMSE |
| 25 | 657 | 0.021 | 0.964 | 0.014 | 40.44 | 0.521 | 0.999 | 0.015 |
| 35 | 714.2 | 0.528 | 0.961 | 0.01 | 99.18 | 0.413 | 0.987 | 0.07 |
| 45 | 876.2 | 0.103 | 0.937 | 0.008 | 228.1 | 0.284 | 0.95 | 0.142 |

| Redlich Peterson $\frac{C_e}{q_e} = \frac{q_m}{k_l} + \frac{C_e}{q_m}$ | | | | | DR model $\ln q_e = \ln q_s - E\left(RT\ln\left(1 + \frac{1}{C_e}\right)\right)^2$ | | |
|---|---|---|---|---|---|---|---|
| $B^{rp}$ | $K_{RP}$ | $R^2$ | RMSE | $q_s$ | E | | $R^2$ |
| 0.45 | 15.15 | 0.995 | 0.002 | 1.82 | 50 | | 0.95 |
| 0.95 | 15.29 | 0.914 | 0.007 | 2.08 | 100 | | 0.481 |
| 0.47 | 163.93 | 0.999 | 0.001 | 2.12 | 288.6 | | 0.353 |

Based on the $R^2$ values, both Freundlich and Redlich Peterson models fitted the isotherm data. The fitting of isotherm data by the Freundlich model indicates that the EBT adsorption by the B—CuFe-CNC (10%) biocomposite was a heterogeneous multilayer process. This heterogeneous nature of the adsorption is also supported by a highly porous, rough, and 2D structure B—CuFe-CNC (10%), as evident from SEM images in FIGS. 3A-3D. The Freundlich constant, 1/n (dimensionless), is the empirical parameter that indicates the heterogeneous nature of the adsorption sites. Furthermore, the value of 1/n<1 (Table 8) represents favorable EBT adsorption onto the B—CuFe-CNC biocomposite. Exponent constant ($B_{rp}$) of the Redlich-Peterson isotherm model is found between 0.45 and 0.95, further indicating that biocomposite possessed heterogeneous surface leading to mono/multi-layers EBT anions adsorption. The maximum monolayer adsorption capacities of the B—CuFe-CNC (10%) biocomposites obtained from the Langmuir model were 657.0, 714.2, and 876.2 mg/g at 25, 35, and 45° C., respectively.

The adsorption potential of the biocomposite linearly increased with increasing temperature. This indicated that the EBT-B—CuFe-CNC (10%) biocomposite is an endothermic adsorption process. The increase in adsorption capacity with a temperature rise is justified based on the following. First, increasing the temperature reduces the viscosity of the aqueous medium and increases the rate of diffusion of the EBT molecules into the pores of the adsorbent.

Batch adsorption experiments were conducted at temperatures ranging from 25 to 45° C. to estimate the thermodynamic adsorption parameters such as enthalpy change $\Delta H°$, entropy change $\Delta S°$, and Gibbs free energy change $\Delta G°$. These parameters were estimated using the following equations. (6)-(8), and their results are summarized in Table 10.

$$LnK_L = \frac{\Delta S°}{R} + -\frac{\Delta H°}{RT} \quad (6)$$

$$\Delta G° = -RT \ln K_L \quad (7)$$

$$K_L = mq_e/C_e \quad (8)$$

where R is gas constant and its value is 8.314 J/mol K, and T is adsorption temperature in K. The values of $\Delta H°$ and $\Delta S°$ were calculated by plotting $LnK_L$ (Langmuir constant) versus 1/T.

TABLE 9

Parameters of thermodynamic for the EBT removal by B—CuFe—CNC (10%) biocomposite.

| $C_o$ (mg/L) | $\Delta H°$ (KJ/mol) | $\Delta S°$ (J/mol K) | $\Delta G°$ (KJ/mol) | | |
|---|---|---|---|---|---|
| | | | 25° C. | 35° C. | 45° C. |
| 40 | 62.22 | 224.02 | −4.65 | −6.518 | −9.147 |
| 120 | 46.68 | 170.67 | −4.07865 | −6.112 | −7.477 |
| 200 | 45.79 | 165.58 | −3.61741 | −5.054 | −6.938 |

As shown in Table 9, the positive value of change in enthalpy implies the adsorption process is endothermic in nature. Similarly, the adsorption process is found spontaneous and associated with the negative values of $\Delta G°$ at all studied temperatures. Moreover, it is evident from Table 9 that the values of $\Delta G°$ reduced at elevated temperatures, which further confirms the spontaneous nature. This decrease in $\Delta G°$ values at higher temperatures increase the number of pores and activation of more biocomposite surface adsorption sites. The positive value of change in entropy implies a high affinity of biocomposite towards dyes.

Example 10: Adsorption Mechanism

Figure 12A:
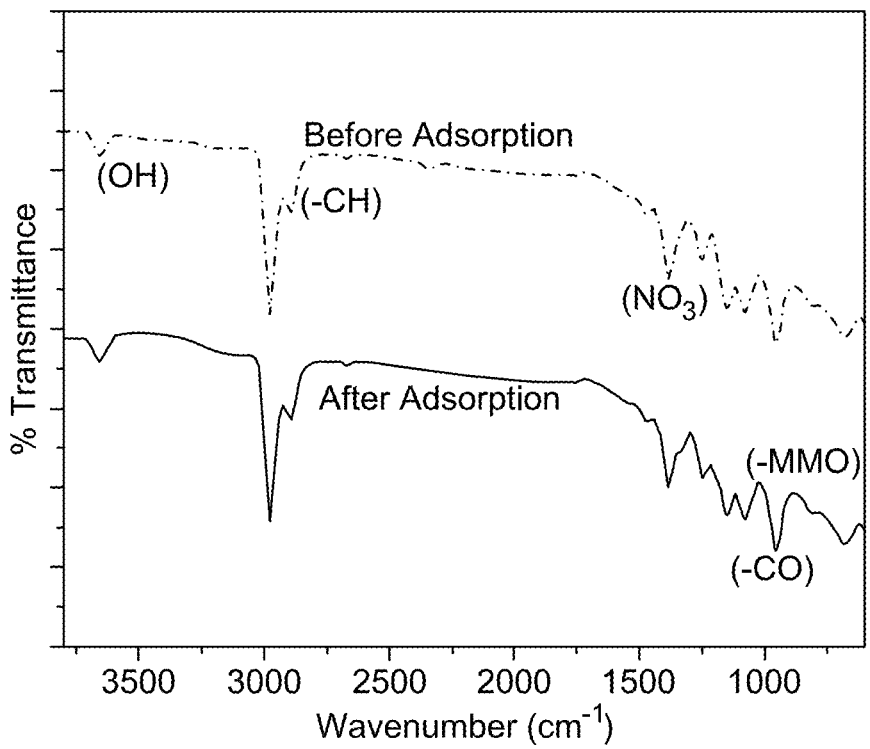
FIG. 12A depicts FT-IR spectra of the B—CuFe-CNC biocomposite before and after the EBT adsorption, according to certain embodiments.

To evaluate the EBT adsorption mechanism, characterization including FT-IR, XRD, XPS, SEM, and equilibrium pH of the B—CuFe-CNC biocomposite after the EBT adsorption was performed and compared with pristine B—CuFe-CNC biocomposite. The FT-IR analysis before and after adsorption (FIG. 12A) shows changes in the characteristics and peak intensity of the B—CuFe-CNC biocomposite after the EBT adsorption. The characteristic peak of methane monooxygenase (MMO) appeared at 590 $cm^{-1}$ and was lowered in intensity after EBT adsorption. This demonstrated the involvement of MMO (Cu—O, Fe—O, and —O—Cu—Fe—O) groups in the removal of the EBT molecules through the formation of the outer-sphere metal complexation mechanism. In addition, the peaks associated with C—O and C—O—C characteristic vibration at 1100-1020 $cm^{-1}$ showed a slight change in peak intensity.

Stretching vibrations of —$SO_3H$ groups at 1230 $cm^{-1}$ changed to a broad and strong peak after the EBT adsorption. This is attributed to the interaction of the EBT anions with —$SO_3H$ via hydrogen bonding. In addition, the peak at 1350 $cm^{-1}$ corresponded to the interlayer nitrate anions slightly changed to a low intensity, which is associated with the interaction with the EBT anions via the anion ion-exchange mechanism. The results confirmed that excess surface functionalities play a role in the enhanced and fast removal of EBT anions from the water phase.

Figure 12B:
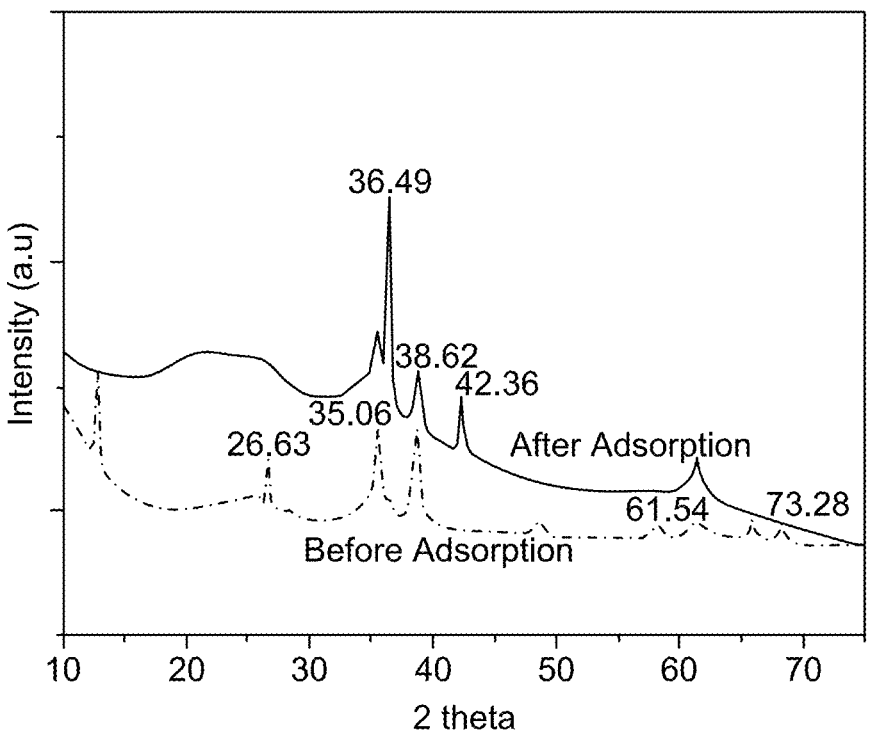
FIG. 12B depicts XRD pattern of the B—CuFe-CNC biocomposite before and after the EBT adsorption, according to certain embodiments.
Figure 12C:
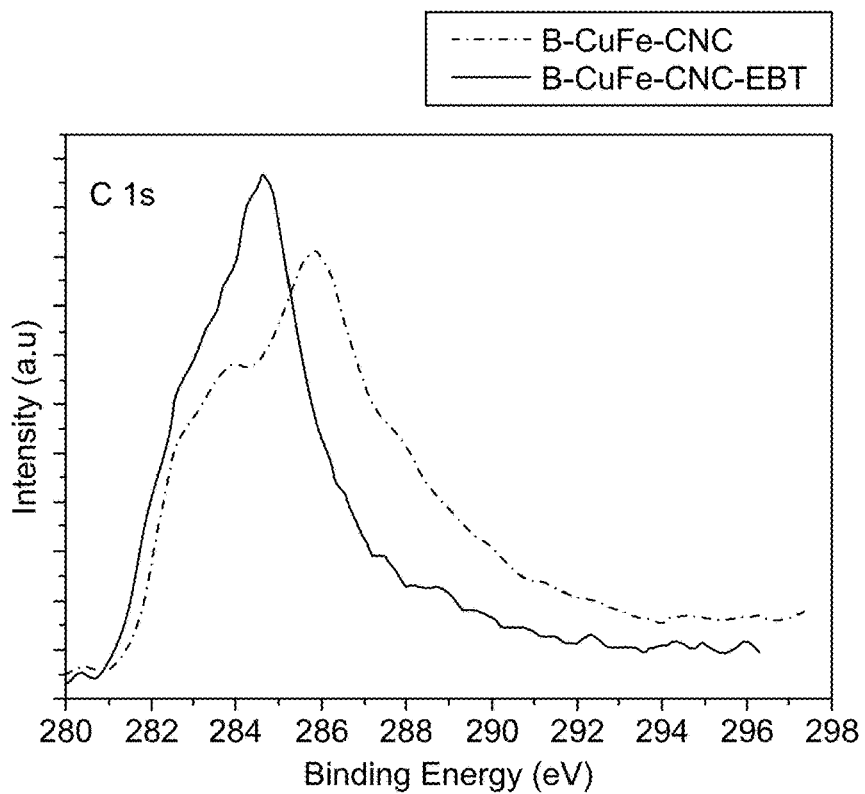
FIG. 12C depicts XPS of C 1s of the B—CuFe-CNC biocomposite before and after the EBT adsorption, according to certain embodiments.

XRD pattern of the biocomposite before and after the EBT adsorption is displayed in FIG. 12B. As observed, the crystalline characteristics peaks of the CuFe LDH in the B—CuFe-CNC biocomposite lowered or almost disappeared after EBT adsorption. This reveals that the EBT anions interacted with surface metallic cations via electrostatic interaction, outer sphere metal complexation and hydrogen bonding. In FIG. 12C, the C1s spectra peaks associated with C—H and C—C appeared at 283.85 and 286.78 eV, respectively. In C1s, spectra of the B—CuFe-CNC-EBT sharp peaks at 284.7 eV were observed. This is attributed to the C—N, which indicates the interaction of the —N group of the EBT species with surface functional groups of the B—CuFe-CNC biocomposite. Additionally, there is a shift of strong OH peak at 532.5 eV-530.42 eV after EBT adsorption. This implies that the —OH functional groups on the biocomposite surface interacted with dye through hydrogen bonding. Similarly, in Cu 2p spectra, the peaks appeared at 953.04 eV and 932.9 eV associated with Cu $2p_{3/2}$ and Cu $2p_{1/2}$ shifted to low values of intensity after EBT adsorption. This is due to the complexation of Cu cations with EBT anionic species via the inner-sphere and outer-sphere metal complexation interface.

Figure 13A:
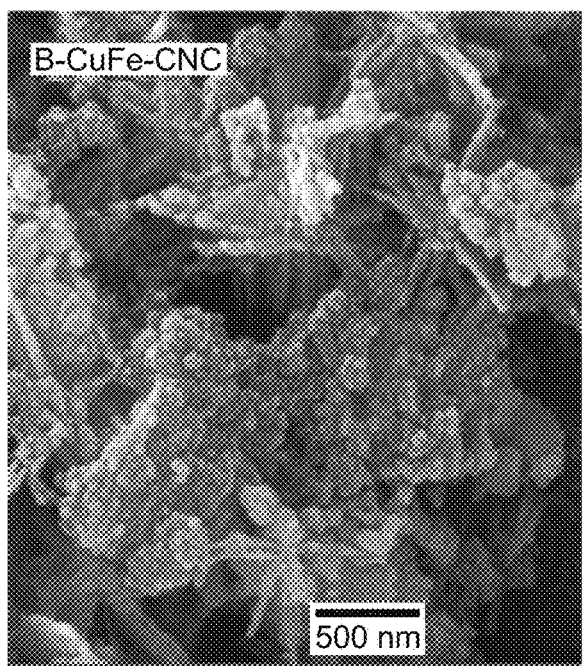
FIG. 13A depicts an SEM image of the B—CuFe-CNC biocomposite before the EBT adsorption, according to certain embodiments.
Figure 13B:
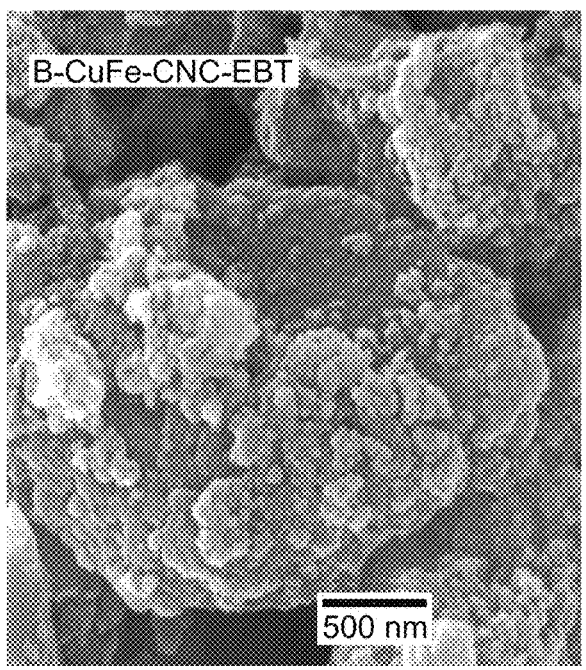
FIG. 13B depicts an SEM image of the B—CuFe-CNC biocomposite after the EBT adsorption, according to certain embodiments.

SEM images of spent biocomposites are shown in FIGS. 13A-13B. After EBT adsorption, the rough surface and rod-like structure of the B—CuFe-CNC biocomposite was entirely changed to a smoother and flat surface-like morphology. The non-porous morphology of the spent B—CuFe-CNC biocomposite implies the complete coverage of the biocomposite binding sites by the dye molecules. Moreover, the 2D rod-like structure of the B—CuFe-CNC biocomposite demonstrated a high affinity for the EBT anionic dye molecules and rapid removal from an aqueous solution.

Figure 12D:
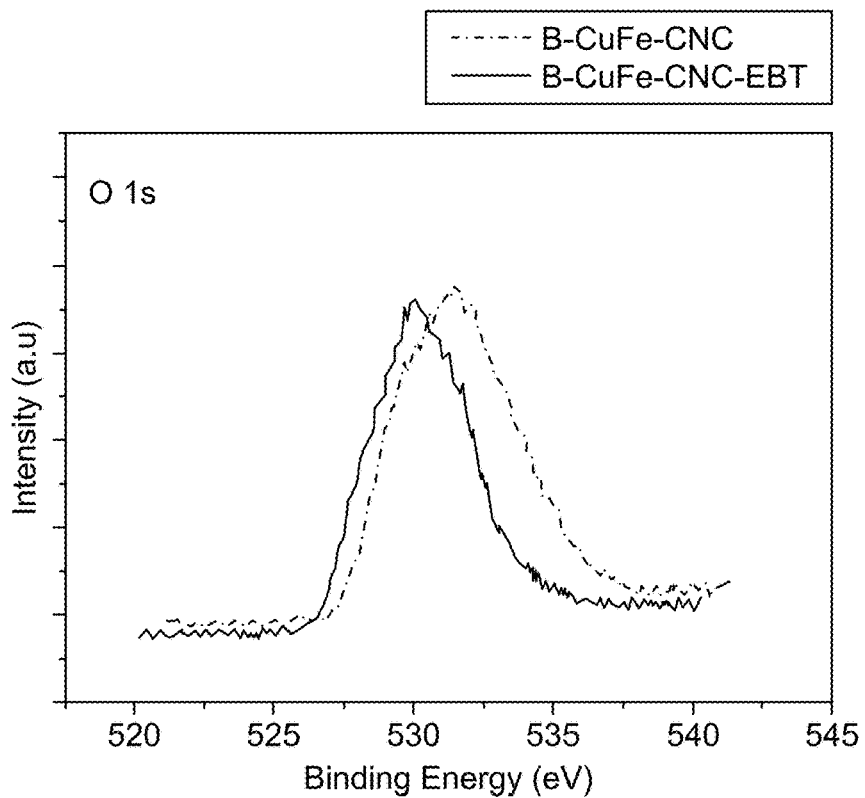
FIG. 12D depicts XPS of O 1s of the B—CuFe-CNC biocomposite before and after the EBT adsorption, according to certain embodiments.
Figure 12E:
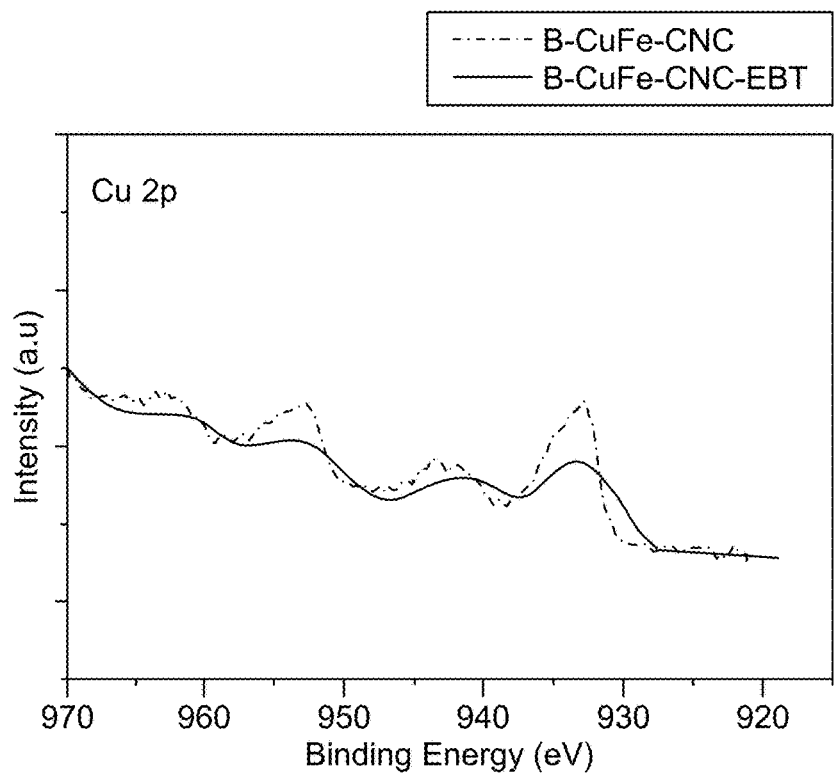
FIG. 12E depicts XPS of Cu 2p of the B—CuFe-CNC biocomposite before and after the EBT adsorption, according to certain embodiments.
Figure 12F:
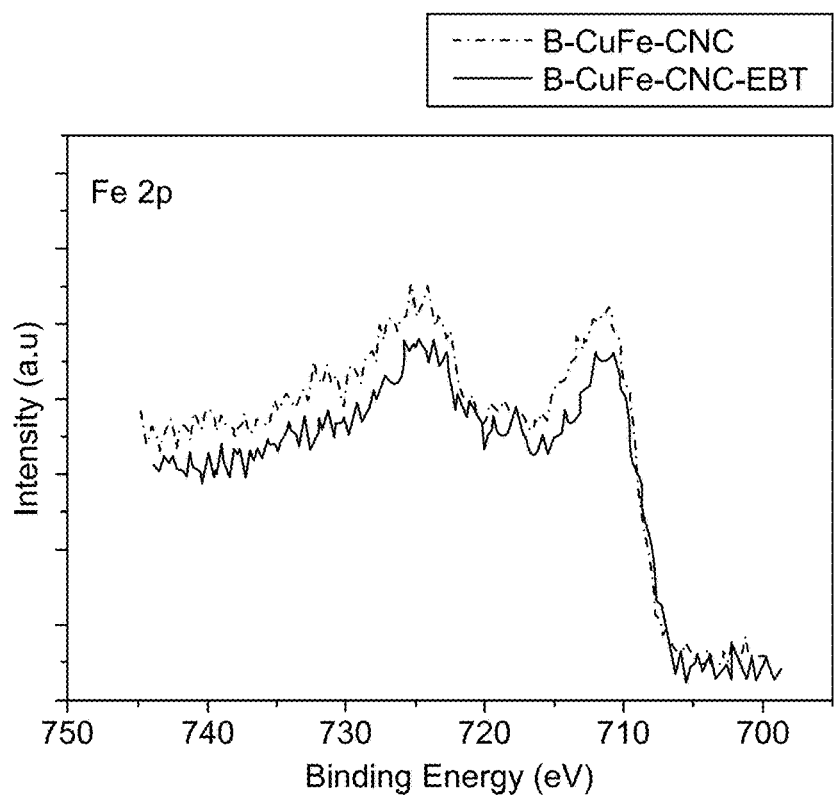
FIG. 12F depicts XPS of Fe 2p of the B—CuFe-CNC biocomposite before and after the EBT adsorption, according to certain embodiments.
Figure 14:
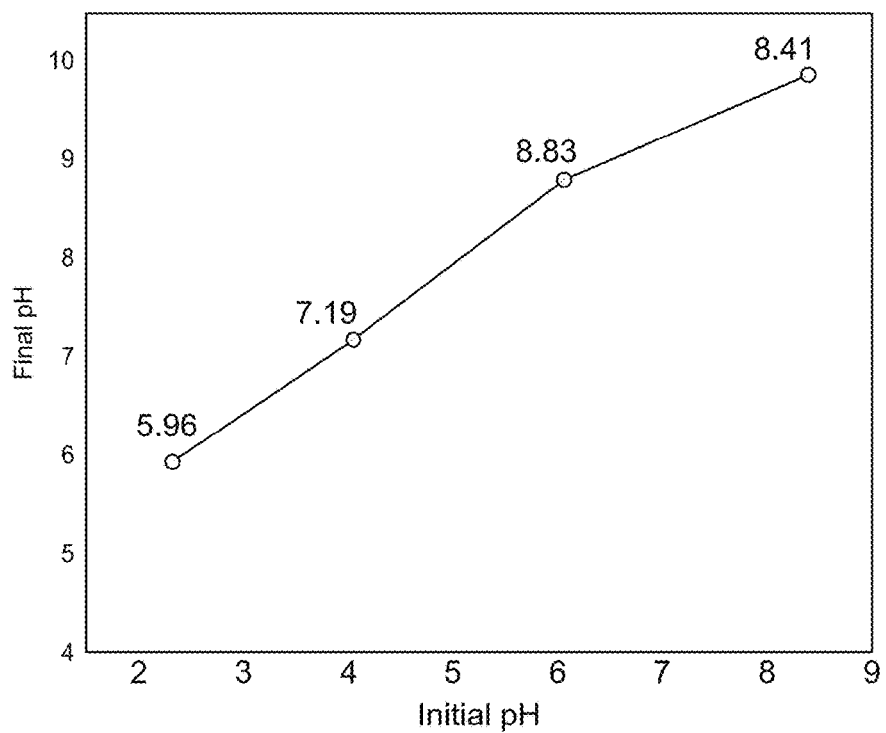
FIG. 14 depicts a change in solution pH after the EBT adsorption by the B—CuFe-CNC biocomposite, according to certain embodiments.

The change in solution pH after EBT adsorption is shown in FIG. 14. As shown, after the EBT adsorption by the B—CuFe-CNC biocomposite, the initial solution pH (2-4) showed an increase in the final solution pH to about 2 fold (FIG. 12D). For instance, the initial pH (2.5-4) of the dye solution increased to 5.98 and 7.19, respectively, after EBT adsorption. This rise in solution pH values after EBT adsorption indicated the release of the outer layer (metal bonded) and interlayer OH ions from the biocomposite surface. This phenomenon allows easy diffusion of the EBT molecules with the biocomposite surfaces and interaction with Cu and Fe metals via surface metal complexation mechanism.

Figure 15:
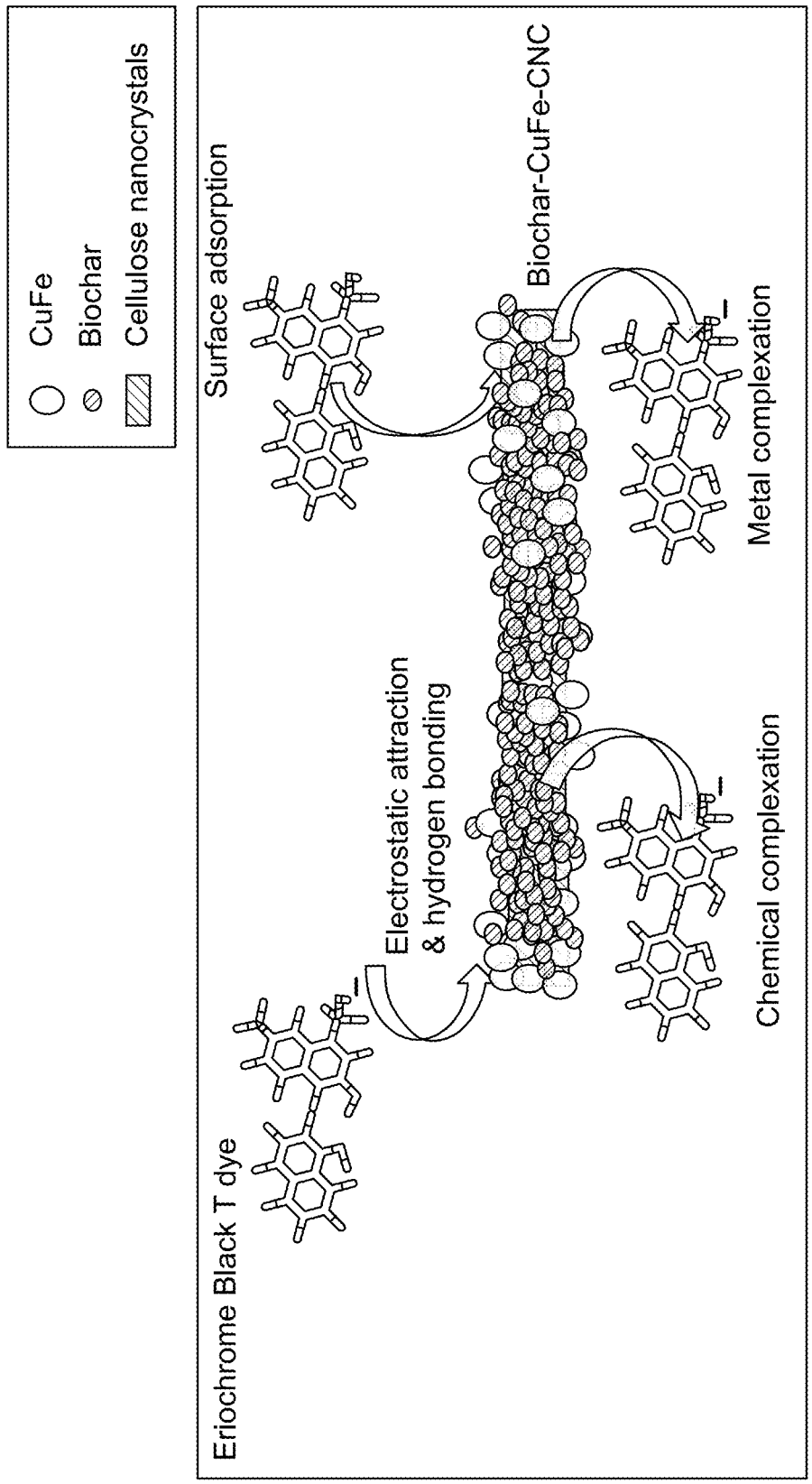
FIG. 15 depicts a schematic mechanism of the EBT adsorption onto the B—CuFe-CNC biocomposite, according to certain embodiments.

Thus, based on spectroscopic and modeling studies, a summary of the EBT adsorption mechanisms by B—CuFe-CNC biocomposite is displayed in FIG. 15. The high adsorption of the EBT onto the B—CuFe-CNC is mainly associated with a multi-adsorption mechanism, involving electrostatic attraction, hydrogen bonding, chemical metal complexation, anion exchange, and surface adsorption. Specifically, the positively charged hydroxyl groups (—$OH_2^+$) on the B—CuFe-CNC biocomposite surface rapidly interacted with negatively charged sulfonated groups (—$SO_3^-$) of the EBT molecules via electrostatic attraction. As a result, the anionic EBT species were exchanged by OH anions and formed a strong interface with surface active metal oxides (Cu—O and Fe—O) via metal complexation and hydrogen bonding. In addition, the highly porous and hydrophilic surface due to the presence of CNCs also promoted the easy trap of the EBT molecules via an external surface adsorption mechanism. Therefore, the three materials present in the biocomposite work together synergistically to form an improved adsorption material.

Example 11: Environmental Application Assessment

The environmental potential of biocomposite was evaluated by investigating the EBT adsorption performance in a competitive environment, complex water system, reusability, and leaching of metal cations.

Figure 16A:
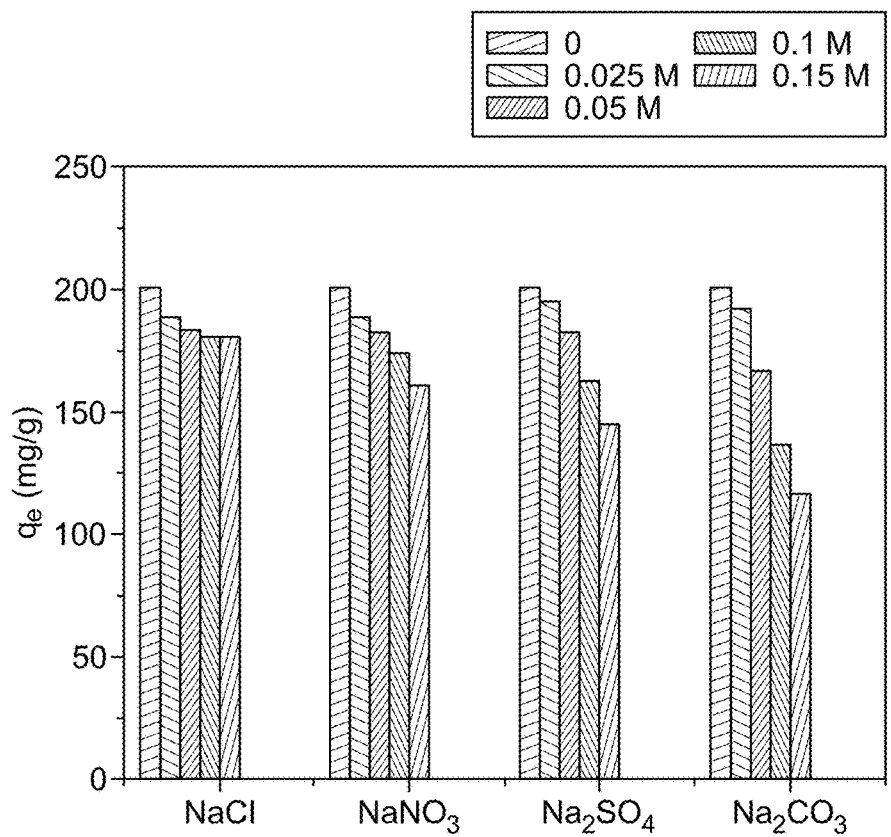
FIG. 16A depicts an effect of various co-existing anions on the adsorption performance by the B—CuFe-CNC biocomposite, according to certain embodiments.

The EBT dye adsorption onto biocomposite in the presence of other anions is presented in FIG. 16A. It was shown that increasing coexisting ions concentration decreased the adsorption of the EBT dye. An increase in the concentration of $Cl^-$ and $NO_3^-$ anions showed insignificant effects on the EBT dye adsorption. However, the presence of $CO_3^{2-}$ and $SO_4^{2-}$ at a concentration of 0.25 M reduced the EBT adsorption capacity from 210 to 125 and 142 mg/g, respectively. This behavior is mainly attributed to the high affinity of anions ($CO_3^{2-}$ and $SO_4^{2-}$) towards surface functionalities of adsorbent, which was stronger than the EBT anions. In addition, $CO_3^{2-}$ and $SO_4^{2}$ anions exhibit higher charge density than $SO_3^-$ anions of the EBT; therefore, a stronger inhibition effect exists on the uptake of the EBT molecules onto the surface of the biocomposite.

The B—CuFe-CNC biocomposite adsorption performance for the EBT dye in various water systems, includes de-ionized water, tap water, seawater, and tertiary wastewater effluent from the Imam Abdulrahman Bin Faisal University treatment plant. The characteristics of water systems are summarized in Table 10.

TABLE 10

Characteristics of different water matrix

| Water characteristics | Tap water | Seawater | Tertiary water |
|---|---|---|---|
| pH | 7.56 | 7.55 | 7.23 |
| Conductivity (mS/cm) | 2.03 | 62.9 | 6.77 |
| Turbidity (NTU) | 3.08 | 54.31 | 74.12 |
| TDS (mg/L) | 265 | 4020 | 327 |
| Hardness (mg/L of $CaCO_3$) | 124 | 4209 | 155 |
| Nitrate (mg/L) | 1.48 | 0.063 | 0.43 |
| Sulfate (mg/L) | 2.85 | 2.96 | 32 |

Figure 16B:
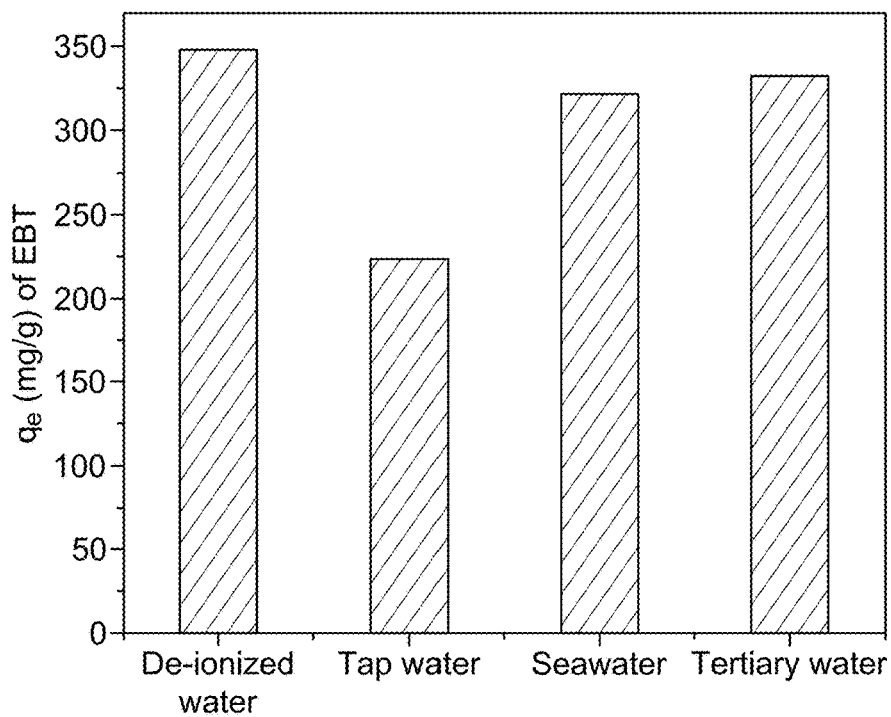
FIG. 16B depicts an adsorption performance of the B—CuFe-CNC biocomposite in different water systems, according to certain embodiments.

The EBT adsorption results are shown in FIG. 16B. It was observed that B—CuFe-CNC biocomposite showed similar comparable adsorption of the EBT dye in deionized water, seawater, and tertiary water systems. The adsorption capacity of the B—CuFe-CNC biocomposite is found as de-ionized>tertiary water>seawater>tap water. However, in tap water, the B—CuFe-CNC biocomposite exhibited reduced EBT adsorption, by nearly 30%, compared to de-ionized water. This is a competitive effect of various mineral divalent ions in tap water impacts the EBT adsorption.

Figure 16C:
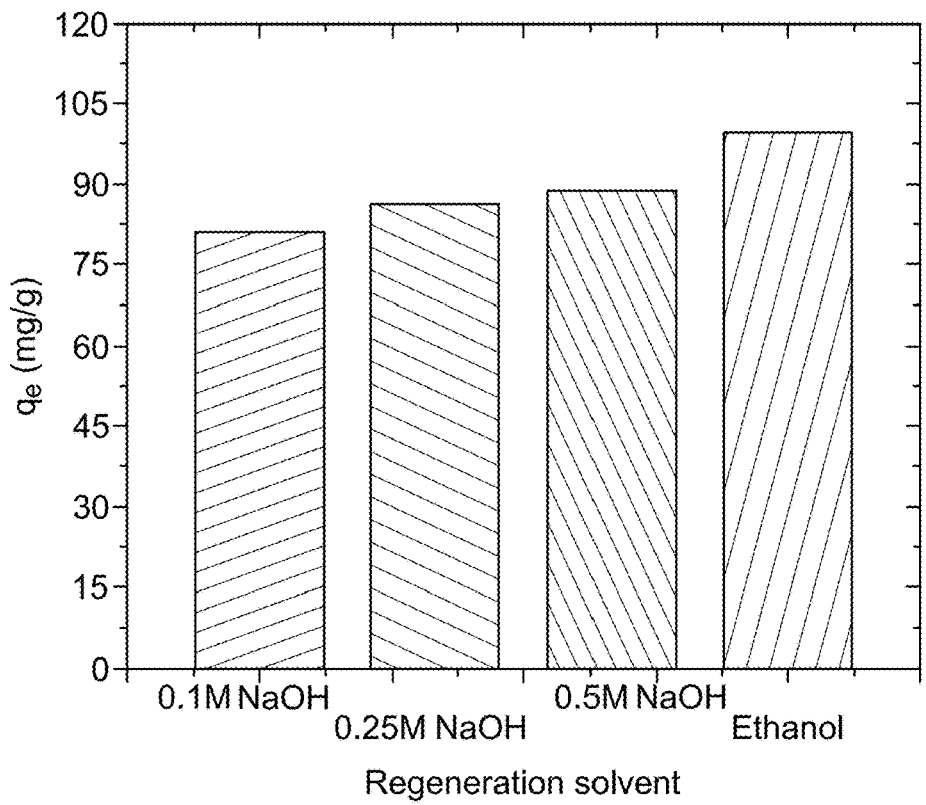
FIG. 16C depicts a re-usability potential of the B—CuFe-CNC biocomposite after first regeneration by NaOH and ethanol solvents, according to certain embodiments.

The reusability potential of the B—CuFe-CNC biocomposite for the EBT adsorption was examined through six successive adsorption and desorption cycles. The adsorption performance of the biocomposite after the first regeneration cycle using NaOH (0.1, 0.25, and 0.5 M) and ethanol as regenerating agents is displayed in FIG. 16C. These results showed that the B—CuFe-CNC biocomposite, after regeneration with ethanol, showed better adsorption of the EBT compared to NaOH. This indicated that ethanol regeneration did not deteriorate the B—CuFe-CNC biocomposite structure and functionality. Moreover, the ethanol is recovered from the dye solution through vacuum distillation. In the case of desorption of NaOH, there is a possibility of the formation of complexation with CNC.

Figure 16D:
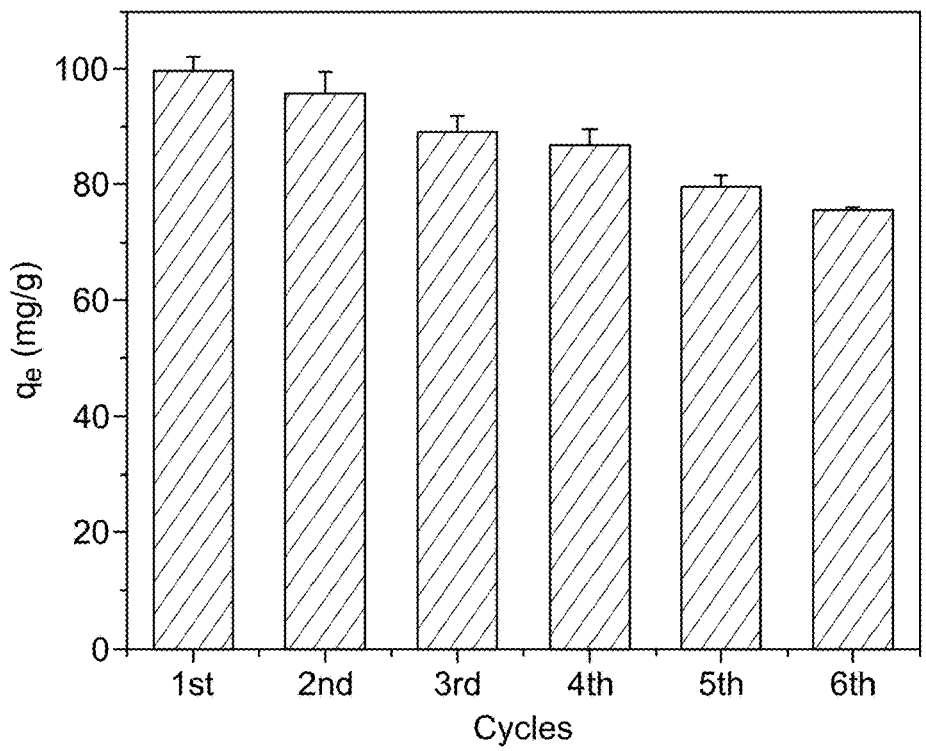
FIG. 16D depicts the reusability potential of the B—CuFe-CNC biocomposite after six regenerating cycles using ethanol, according to certain embodiments.

The dye adsorption capacity of the B—CuFe-CNC biocomposite after regenerating with ethanol is shown in FIG. 16D. As shown, the adsorption capacity of the biocomposite is reduced by approximately 24% after six successive regeneration cycles. This indicates that the biocomposite can be utilized as a low-cost, eco-friendly, sustainable, and efficient adsorbent for removing toxic organic dyes from industrial effluents.

Leaching of metal cations (Cu and Fe) from the B—CuFe-CNC biocomposite is determined by analyzing the cations concentration after the EBT adsorption in the treated water. The EBT adsorption experiment was performed at EBT concentration (200 mg/L), composite dosage (0.1 g/L), temperature (25, 35, and 45° C.) at fixed pH 2.5, and contact time 360 min. The results obtained from the ICP-MS analysis of treated water samples and the acceptable World Health Organization (WHO) permissible limit (Organization, W. H., 1963. International Standards for drinking water) are listed in Table 11.

TABLE 11

Leaching of Cu and Fe in treated EBT water

| | | ICP-MS analysis | | WHO limit | |
|---|---|---|---|---|---|
| Adsorbent | Temperature (° C.) | Cu (mg/L) | Fe (mg/L) | Cu (mg/L) | Fe (mg/L) |
| B—CuFe—CNC | 25 | 0.51 | <0.0005 | 1.5 | 0.3 |
| | 35 | 0.63 | <0.0005 | | |
| | 45 | 0.76 | <0.0005 | | |

The results indicated that the leaching concentration of $Cu^{2+}$ and $Fe^{3+}$ in treated water after the EBT adsorption using the B—CuFe-CNC biocomposite is $Cu^{2+}$ (0.51-0.7 mg/L) and $Fe^{3+}$ (<0.0005 mg/L), which is lower than the permissible limit of WHO. Based on these results, the prepared biocomposite can effectively treat dye-contaminated water systems without proposing any secondary pollution due to the leaching of metallic cations from the adsorbent surface.

Numerous modifications and variations of the present disclosure are possible in light of the above teachings. It is therefore to be understood that within the scope of the appended claims, the invention may be practiced otherwise than as specifically described herein.

The invention claimed is:

1. A method of adsorbing a dye from an aqueous solution, comprising:
    contacting a composition with the aqueous solution,
    wherein at least a portion of the dye adsorbs to the composition,
    wherein the composition comprises:
    biochar;
    cellulose nanocrystals; and
    a layered double hydroxide (LDH),
    wherein the LDH comprises Cu and Fe,
    wherein particles of the LDH and the biochar at least partially cover an outer surface of the cellulose nanocrystals; and
    wherein the composition comprises from 1-30 wt. % of the cellulose nanocrystals based on the weight of the biochar in the composition.

2. The method of claim 1, wherein the composition comprises 0.1-9 wt. % of the cellulose nanocrystals, 10-30 wt. % of the biochar, and 65-75 wt. % of the LDH, based on a total weight of the composition.

3. The method of claim 1, wherein the LDH comprises Cu and Fe in a ratio range of 10:1 to 1:1.

4. The method of claim 1, wherein particles of the LDH are spherical and have an average diameter of 10-30 nm.

5. The method of claim 1, wherein particles of the cellulose nanocrystals have a rod shape with an average length of 300-900 nanometers (nm), and an average thickness of 10-50 nm.

6. The method of claim 1, wherein the particles of the cellulose nanocrystals form aggregates, wherein the aggregates have an average thickness of 100 to 500 nm.

7. The method of claim 1, wherein the LDH is uniformly distributed on the outer surface of the cellulose nanocrystals.

8. The method of claim 1, wherein the composition is porous, and has an average pore size of 15-20 nm.

9. The method of claim 1, wherein the composition has —$OH_2$+ on an outer surface.

10. The method of claim 1, wherein the composition has a Brunauer-Emmett-Teller (BET) surface area of 200-280 meter square per gram ($m^2/g$).

11. The method of claim 1, wherein the aqueous solution has a pH of 2-5.

12. The method of claim 1, wherein the aqueous solution has a temperature of 24-30° C.

13. The method of claim 1, wherein the composition has a concentration of 1-10 milligrams per liter (mg/L) in the aqueous solution.

14. The method of claim 1, wherein the dye has a concentration of 40-200 mg/L in the aqueous solution.

15. The method of claim 1, wherein the adsorbing of the dye to the composition reaches an equilibrium in 30-45 minutes.

16. The method of claim 1, wherein the adsorbing of the dye to the composition is through hydrogen bonding and metal complexation with the Cu and Fe.

17. The method of claim 1, wherein the dye is an azo dye.

18. The method of claim 1, wherein the maximum adsorption capacity of the composition is 600-900 milligrams per gram (mg/g).

* * * * *